United States Patent
Kitamura

(10) Patent No.: US 12,031,050 B2
(45) Date of Patent: Jul. 9, 2024

(54) PAINT COMPOSITION AND MULTILAYER COATING FILM FORMATION METHOD

(71) Applicant: KANSAI PAINT CO., LTD., Hyogo (JP)

(72) Inventor: Takashi Kitamura, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 218 days.

(21) Appl. No.: 17/190,502

(22) Filed: Mar. 3, 2021

(65) Prior Publication Data

US 2021/0277273 A1   Sep. 9, 2021

(30) Foreign Application Priority Data

Mar. 4, 2020 (JP) ................ 2020-036781

(51) Int. Cl.
 C09D 133/08 (2006.01)
 B05D 7/00 (2006.01)
 C09D 167/02 (2006.01)
 C09D 177/04 (2006.01)

(52) U.S. Cl.
 CPC ........... *C09D 133/08* (2013.01); *B05D 7/532* (2013.01); *B05D 7/572* (2013.01); *C09D 167/02* (2013.01); *C09D 177/04* (2013.01)

(58) Field of Classification Search
 CPC .. C09D 133/08; C09D 167/02; C09D 177/04; B05D 7/532; B05D 7/572
 See application file for complete search history.

(56) References Cited

U.S. PATENT DOCUMENTS

| 9,701,866 B2 | 7/2017 | Kanda |
| 2015/0064476 A1 | 3/2015 | Kanda |

FOREIGN PATENT DOCUMENTS

| CN | 104321395 A | | 1/2015 | |
| CN | 108424698 A | * | 8/2018 | ........... B05D 3/0218 |
| JP | 2006-305515 A | | 11/2006 | |
| WO | WO-2019131957 A1 | * | 7/2019 | ............... B05D 1/36 |

OTHER PUBLICATIONS

English Translation of WO-2019131957.*
English translation of CN 108424698.*
English Machine Translation of JP 2006-305515 A published Nov. 9, 2006.

* cited by examiner

*Primary Examiner* — Robert S Walters, Jr.
(74) *Attorney, Agent, or Firm* — MILLEN, WHITE, ZELANO & BRANIGAN, P.C.; Csaba Henter

(57) ABSTRACT

To provide a paint composition capable of forming a coating film having a small graininess, having high flip-flop property, and having excellent chipping resistance and adhesion. According to the present invention, there is provided a paint composition including a hydroxy group-containing acrylic resin (A), a hydroxy group-containing polyester resin (B), an amino resin (C), and a titanium oxide-coated light interference pigment (D), which has an $L^*15$ value of 100 or more and an $L^*110$ value of 65 or less, wherein the solid content of the hydroxy group-containing acrylic resin (A) is in the range of 20 to 60 parts by mass, the solid content of the hydroxy group-containing polyester resin (B) is in the range of 10 to 50 parts by mass, the solid content of the amino resin (C) is in the range of 5 to 40 parts by mass, and the solid content of the titanium oxide-coated light interference pigment (D) is in the range of 3 to 25 parts by mass, relative to 100 parts by mass of the total solid content of the hydroxy group-containing acrylic resin (A), the hydroxy group-containing polyester resin (B), and the amino resin (C).

20 Claims, No Drawings

PAINT COMPOSITION AND MULTILAYER COATING FILM FORMATION METHOD

FIELD

The present invention relates to a paint composition and a multilayer coating film formation method.

BACKGROUND

In the field of automobile paint, demand for coating film durability and coating film appearance maintenance has been increasing, and in particular, a problem of a reduction in durability of a coating film due to impact peeling has been emphasized. Automobiles driving on roads sometimes encounter an impact peeling phenomenon, so-called "chipping", in which a small stone thrown by a wheel collides with the outer coating film surface, and the coating film partially peels from the car body locally or partially due to the impact. Due to this phenomenon, there is a problem that the coating film peels off and the aesthetic property of the coated surface is remarkably impaired. Further, since automobiles are assumed to be used under various climatic conditions, it is necessary that the above coating film have high adhesion to the coated object even under conditions such as when water is present on the surface of the coating film in locations where the air temperature is high.

Furthermore, in the field of automobile paint, coating films having a metallic tone may be used. Metallic tone is a texture characterized in that a graininess of the bright pigment in the coating film is small, and further, when viewed in a state close to perpendicular to the coating plate (high-light), the texture shines, and when viewed from diagonally from above a coating plate (shade), there is a dark appearance, i.e., a difference in brightness between the high-light region and the shade region is significant. Furthermore, a high difference in brightness between the high-light region and the shade region indicates a high flip-flop property.

Thus, in the field of automobile paint, there is a demand for a coating film which has a small graininess, has a high flip-flop property, and has excellent chipping resistance and adhesiveness.

For example, Patent Literature 1 discloses a method of forming a chipping-resistant multilayer coating film, which is characterized by comprising a basecoat film formation step wherein a basecoat film is formed by coating a medium coating film or on a colored basecoat film with a basecoat material containing a scale-like titanate pigment, and a clearcoat film formation step wherein a clearcoat film is formed on the basecoat film. Patent Literature 1 further describes that a multilayer coating film having high chipping resistance can be obtained by the method of forming a chipping-resistant multilayer coating film.

CITATION LIST

Patent Literature

[PTL 1] Japanese Unexamined Patent Publication (Kokai) No. 2006-305515

SUMMARY

Technical Problem

In the technology described in Patent Literature 1, in some cases, the flip-flop property and the adhesiveness of the formed coating film may not be sufficient.

In view of the above circumstances of the prior art, the object of the present invention is to provide a paint composition with which a coating film having a small graininess, a high flip-flop property, and having excellent chipping resistance and adhesion can be formed.

Solution to Problem

As a result of rigorous investigation to solve the above problems, the present inventors have discovered that the above problems can be solved by a paint composition comprising a hydroxy group-containing acrylic resin (A), a hydroxy group-containing polyester resin (B), an amino resin (C), and a titanium oxide-coated light interference pigment (D), which has an $L^*15$ value of 100 or more and an $L^*110$ value of 65 or less, at a predetermined ratio, and have completed the present invention.

The present invention relates to the <1> to <12> below.
<1> A paint composition, comprising a hydroxy group-containing acrylic resin (A), a hydroxy group-containing polyester resin (B), an amino resin (C), and a titanium oxide-coated light interference pigment (D), which has an $L^*15$ value of 100 or more and an $L^*110$ value of 65 or less, wherein the solid content of the hydroxy group-containing acrylic resin (A) is in the range of 20 to 60 parts by mass, the solid content of the hydroxy group-containing polyester resin (B) is in the range of 10 to 50 parts by mass, the solid content of the amino resin (C) is in the range of 5 to 40 parts by mass, and the solid content of the titanium oxide-coated light interference pigment (D) is in the range of 3 to 25 parts by mass, relative to 100 parts by mass of the total solid content of the hydroxy group-containing acrylic resin (A), the hydroxy group-containing polyester resin (B), and the amino resin (C).
<2> The paint composition according to <1>, wherein the glass transition temperature (Tg) of the hydroxy group-containing polyester resin (B) is in the range of –20° C. to 5° C.
<3> The paint composition according to <1> or <2>, wherein the hydroxy group-containing polyester resin (B) is a hydroxy group-containing polyester resin obtained by condensing a polyol (b-1) having two or more hydroxy groups and a polycarboxylic acid (b-2) having two or more carboxyl groups, and the polycarboxylic acid (b-2) comprises at least one type of polycarboxylic acid selected from the group consisting of 1,2-cyclohexanedicarboxylic acid and 1,2-cyclohexanedicarboxylic acid anhydride.
<4> The paint composition according to any one of <1> to <3>, wherein the titanium oxide-coated light interference pigment (D), which has an $L^*15$ value of 100 or more and an $L^*110$ value of 65 of less, is a titanium oxide-coated mica pigment (D1) having an $L^*15$ value of 100 or more and an $L^*110$ value of 65 or less.
<5> The paint composition according to any one of <1> to <4>, further comprising a scale-like aluminum pigment (E).
<6> The paint composition according to <5>, wherein the total solid content of the titanium oxide-coated light interference pigment (D), which has an $L^*15$ value of 100 or more and an $L^*110$ value of 65 or less, and the scale-like aluminum pigment (E) is in the range of 6 to 25 parts by mass, relative to 100 parts by mass of the total solid content of the hydroxy group-containing acrylic resin (A), the hydroxy group-containing polyester resin (B), and the amino resin (C).

<7> The paint composition according to <5> or <6>, wherein the content ratio (D)/(E) of the titanium oxide-coated light interference pigment (D), which has an L*15 value of 100 or more and an L*110 value of 65 or less, and the scale-like aluminum pigment (E) is in the range of 10/90 to 99/1 as a solid content mass ratio.

<8> A multilayer coating film formation method, comprising the steps of:
(I-1) coating an object to be coated with a basecoat paint composition (Y) to form an uncured basecoat coating film,
(I-2) coating the uncured basecoat coating film with a clearcoat paint composition (Z) to form an uncured clearcoat coating film, and
(I-3) heating the uncured basecoat coating film and the uncured clearcoat coating film to simultaneously cure both films, wherein
the basecoat paint composition (Y) is the paint composition according to any one of <1> to <7>.

<9> A multilayer coating film formation method, comprising the steps of:
(II-1) coating an object to be coated with a colored paint composition (X) to form an uncured colored coating film,
(II-2) coating the uncured colored coating film with a basecoat paint composition (Y) to form an uncured basecoat coating film,
(II-3) coating the uncured basecoat coating film with a clearcoat paint composition (Z) to form an uncured clearcoat coating film, and
(II-4) heating the uncured colored coating film, the uncured basecoat coating film, and the uncured clearcoat coating film to simultaneously cure them, wherein
the basecoat paint composition (Y) is the paint composition according to any one of <1> to <7>.

<10> The multilayer coating film formation method according to <9>, wherein the L*110 lightness value of the colored coating film formed by the colored paint composition (X) is in the range of 5 to 80.

<11> The multilayer coating film formation method according to any one of <8> to <10>, wherein the clearcoat paint composition (Z) comprises a hydroxy-group containing resin and a polyisocyanate compound.

<12> The multilayer coating film formation method according to any one of <8> to <11>, wherein the L*15 value of the multilayer coating film is in the range of 75 to 140 and the L*110 value is in the range of 3 to 50.

Advantageous Effects of Invention

According to the present invention, there can be provided a paint composition with which a coating film having a small graininess, having a high flip-flop property, and having good chipping resistance and good adhesion can be formed.

DESCRIPTION OF EMBODIMENTS the present invention will be described in detail below. However, these embodiments are merely examples of desirable embodiments, and the present invention is not limited to these contents.

[Paint Composition]

The paint composition of the present invention contains a hydroxy group-containing acrylic resin (A), a hydroxy group-containing polyester resin (B), an amino resin (C), and a titanium oxide-coated light interference pigment (D) having an L*15 value of 100 or more and an L*110 value of 65 or less.

[Hydroxy Group-Containing Acrylic Resin (A)]

The hydroxy group-containing acrylic resin (A) can conventionally be produced by copolymerizing a hydroxy group-containing polymerizable unsaturated monomer (a) and another polymerizable unsaturated monomer (b), which can be copolymerized with the hydroxy group-containing polymerizable unsaturated monomer (a), by a method which itself is known such as a solution polymerization method in an organic solvent or an emulsion polymerization method in an aqueous medium.

The above-mentioned hydroxy group-containing polymerizable unsaturated monomer (a) is a compound having at least one hydroxy group and a polymerizable unsaturated group per molecule, and may include, for example, monoesterified products of (meth)acrylic acid and divalent alcohols having 2 to 8 carbon atoms, such as 2-hydroxyethyl (meth)acrylate, 2-hydroxypropyl (meth)acrylate, 3-hydroxypropyl (meth)acrylate, 4-hydroxybutyl (meth)acrylate; ε-caprolactone modified products of these monoesterified products; N-hydroxymethyl (meth)acrylamide; allyl alcohols; and (meth)acrylates having a polyoxyethylene chain having a hydroxy group at the molecular end thereof.

However, in the present invention, a monomer corresponding to a polymerizable unsaturated monomer (xvii) having an UV-absorbing functional group, which is described later, should be defined as the above "other polymerizable unsaturated monomer (b), which can be copolymerized with the hydroxy group-containing polymerizable unsaturated monomer (a)", and is removed from the hydroxy group-containing polymerizable unsaturated monomer (a). The above hydroxy group-containing polymerizable unsaturated monomer (a) may be used alone or in combination of two or more.

Note that as used herein, "polymerizable unsaturated group" means an unsaturated group which can be radically polymerized. Examples of such a polymerizable unsaturated group include a vinyl group, a (meth)acryloyl group, a (meth)acrylamide group, a vinyl ether group, an allyl group, a propenyl group, an isopropenyl group, and a maleimide group.

As used herein, "(meth)acrylate" means acrylate or methacrylate, and "(meth)acrylic acid" means acrylic acid or methacrylic acid. Furthermore, "(meth)acryloyl" means acryloyl or methacryloyl. "(Meth)acrylamide" means acrylamide or methacrylamide.

The other polymerizable unsaturated monomer (b), which can be copolymerized with the hydroxy group-containing polymerizable unsaturated monomer (a), can be appropriately selected and used according to characteristics desired for the hydroxy group-containing acrylic resin (A). Specific examples of the monomer (b) include those described in (i) to (xix) below. These may be used alone or in combination of two or more thereof.

(i) Alkyl or cycloalkyl (meth)acrylate: for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, dodecyl (meth)acrylate, tridecyl (meth)acrylate, stearyl (meth)acrylate, isostearyl (meth)acrylate, cyclohexyl (meth)acrylate, methylcyclohexyl (meth)

acrylate, tert-butylcyclohexyl (meth)acrylate, cyclododecyl (meth)acrylate, and tricyclodecanyl (meth)acrylate.

(ii) Polymerizable unsaturated monomers having an isobornyl group: for example, isobornyl (meth)acrylate.

(iii) Polymerizable unsaturated monomers having an adamantyl group: for example, adamantyl (meth)acrylate.

(iv) Polymerizable unsaturated monomers having a tricyclodecenyl group: for example, tricyclodecenyl (meth)acrylate.

(v) Aromatic ring-containing polymerizable unsaturated monomers: for example, benzyl (meth)acrylate, styrene, α-methylstyrene, and vinyltoluene.

(vi) Polymerizable unsaturated monomers having an alkoxysilyl group: for example, vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane.

(vii) Polymerizable unsaturated monomers having a fluorinated alkyl group: for example, perfluoroalkyl (meth)acrylates such as perfluorobutylethyl (meth)acrylate, and perfluorooctylethyl (meth)acrylate; and fluoroolefins.

(viii) Polymerizable unsaturated monomers having a photopolymerizable functional group such as a maleimide group.

(ix) Vinyl compounds: for example, N-vinylpyrrolidone, ethylene, butadiene, chloroprene, vinyl propionate, and vinyl acetate.

(x) Carboxyl group-containing polymerizable unsaturated monomers: for example, (meth)acrylic acid, maleic acid, crotonic acid, and β-carboxyethylacrylate.

(xi) Nitrogen-containing polymerizable unsaturated monomers: for example, (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis (meth)acrylamide, ethylenebis (meth)acrylamide, 2-(methacryloyloxy)ethyltrimethylammonium chloride, and adducts of glycidyl (meth)acrylate and an amine.

(xii) Polymerizable unsaturated monomers having two or more polymerizable unsaturated groups per molecule: for example, allyl (meth)acrylate, ethylene glycol di(meth)acrylate, 1,4-butanediol di(meth)acrylate, neopentylglycol di(meth)acrylate, and 1,6-hexanediol di(meth)acrylate.

(xiii) Epoxy group-containing polymerizable unsaturated monomers: for example, glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allylglycidyl ether.

(xiv) (Meth)acrylates having a polyoxyethylene chain with an alkoxy group at the molecular end thereof.

(xv) Polymerizable unsaturated monomers having a sulfonic acid group: for example, 2-acrylamide-2-methylpropanesulfonic acid, 2-sulfoethyl (meth)acrylate, allylsulfonic acid, and 4-styrenesulfonic acid; and sodium salts and ammonium salts of these sulfonic acids.

(xvi) Polymerizable unsaturated monomers having a phosphate group: acid phosphooxyethyl (meth)acrylate, acid phosphooxypropyl (meth)acrylate, acid phosphooxypoly(oxyethylene) glycol (meth)acrylate, and acid phosphooxypoly(oxypropylene) glycol (meth)acrylate.

(xvii) Polymerizable unsaturated monomers having a UV-absorbing functional group: for example, 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, and 2-(2'-hydroxy-5'-methacryloxyethyl phenyl)-2H-benzotriazole.

(xviii) Photostable polymerizable unsaturated monomers: for example, 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine.

(xix) Polymerizable unsaturated monomers having a carbonyl group: for example, acrolein, diacetone acrylamide, diacetone methacrylamide, acetoacetoxyethyl methacrylate, formylstylol, and vinyl alkyl ketones having 4 to 7 carbon atoms (e.g., vinyl methyl ketone, vinyl ethyl ketone, vinyl butyl ketone).

The hydroxy group-containing acrylic resin (A) can also be used in combination with a so-called "urethane-modified acrylic resin", which is lengthened to a high molecular weight by subjecting a polyisocyanate compound to a urethanization reaction on a part of hydroxy groups in the resin.

The hydroxy group-containing polymerizable unsaturated monomer (a) may conventionally be used in the range of 1 to 50% by mass, preferably 2 to 40% by mass, and more preferably 3 to 30% by mass, based on the total quantity of the hydroxy group-containing polymerizable unsaturated monomer (a) and the copolymerizable other polymerizable unsaturated monomer (b).

From the viewpoint of chipping resistance and adhesion of the coating film to be formed, it is preferable that the hydroxy group-containing acrylic resin (A) generally have a hydroxy value in the range of 1 to 200 mgKOH/g, in particular, 2 to 150 mgKOH/g, and further particularly 5 to 100 mgKOH/g.

From the viewpoint of flip-flop property and adhesiveness of the coating film to be formed, it is preferable that the hydroxy group-containing acrylic resin (A) generally have an acid value in the range of 1 to 200 mgKOH/g, in particular, 2 to 150 mgKOH/g, and further particularly 5 to 80 mgKOH/g.

From the viewpoint of chipping resistance and adhesion of the coating film to be formed, it is further preferable that the hydroxy group-containing acrylic resin (A) generally have a weight average molecular weight within the range of 2,000 to 5,000,000, in particular, 4,000 to 1,000,000, and further particularly 8,000 to 500,000.

Note that as used herein, number average molecular weight and weight average molecular weight are values obtained by converting a retention time (retention capacity) measured using gel permeation chromatography (GPC) into a molecular weight of polystyrene based on a retention time (retention capacity) of a standard polystyrene having a known molecular weight measured under the same conditions. Specifically, measurement can be carried out using a gel permeation chromatograph device, "HLC-8120GPC" (product name, manufactured by Tosoh Corporation) is used, as the column, a total of four including "TSKgel G4000HXL", "TSKgel G3000HXL", "TSKgel G2500HXL", and "TSKgel G2000HXL" (product name, all manufactured by Tosoh Corporation) are used, as the detector, a differential refractometer is used, using tetrahydrofuran as the mobile phase, at measurement temperature of 40° C. and a flow rate of 1 mL/min.

When the paint composition of the present invention is an aqueous coating material, it is preferable that the hydroxy group-containing acrylic resin (A) comprises a water-dispersible hydroxy group-containing acrylic resin (A') which has a core/shell multilayer structure comprising a core of a copolymer (I) obtained by copolymerizing a polymerizable unsaturated monomer (c) having at least two polymerizable unsaturated groups per molecule with a polymerizable unsaturated monomer (d) having one polymerizable unsaturated group per molecule and a shell of a copolymer (II) obtained by copolymerizing a polymerizable unsaturated monomer (b) other than the hydroxy group-containing polymerizable unsaturated monomer (a) with the hydroxy group-containing polymerizable unsaturated monomer (a), from the viewpoint of chipping resistance and adhesion of a coating film to be formed.

Examples of the polymerizable unsaturated monomer (c) having at least two polymerizable unsaturated groups per molecule include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butandiol di(meth)acrylate, neopentylglycol di(meth)acrylate, 1,6-hexane diol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, and divinylbenzene. These may be used alone or in combination of two or more thereof.

The polymerizable unsaturated monomer (c) having at least two polymerizable unsaturated groups per molecule can generally be used in the range of 0.1 to 30% by mass, preferably 0.1 to 10% by mass, and more preferably 0.1 to 5% by mass, based on the total mass of the monomer (c) and the monomer (d).

Further, the polymerizable unsaturated monomer (d) having one polymerizable unsaturated group per molecule is a polymerizable unsaturated monomer which can be copolymerized with the polymerizable unsaturated monomer (c) having at least two polymerizable unsaturated groups per molecule, and includes a compound containing one polymerizable unsaturated group, for example, a vinyl group, a (meth)acryloyl group, and an allyl group per molecule.

Specific examples of the polymerizable unsaturated monomer (d) having one polymerizable unsaturated group per molecule include alkyl or cycloalkyl (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (product name, manufactured by Osaka Organic Chemical Industry Ltd.), cyclohexyl (meth)acrylate, methylcyclohexyl (meth)acrylate, tert-butylcyclohexyl (meth)acrylate, and cyclododecyl (meth)acrylate; polymerizable unsaturated monomers having an isobornyl group such as isobornyl (meth)acrylate; polymerizable unsaturated monomers having an adamantyl group such as adamantyl (meth)acrylate; vinyl aromatic compounds such as styrene, α-methylstyrene, and vinyltoluene; hydroxy group-containing polymerizable unsaturated monomers, for example, monoesterified products of (meth)acrylic acid and a divalent alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate, ε-caprolactone modified product of the monoesterified products of (meth)acrylic acid and a divalent alcohol having 2 to 8 carbon atoms, allyl alcohols, and (meth)acrylates having a polyoxyethylene chain having a hydroxy group at the molecular end thereof; carboxyl group-containing polymerizable unsaturated monomers such as (meth)acrylic acid, maleic acid, crotonic acid, and β-carboxyethyl acrylate; and nitrogen-containing polymerizable unsaturated monomers such as (meth)acrylonitrile, (meth)acrylamide, dimethylaminopropyl (meth)acrylamide, dimethylaminoethyl (meth)acrylate, and adducts of glycidyl (meth)acrylate and an amine. These may be used alone or in combination of two or more thereof.

Specific examples of the hydroxy group-containing polymerizable unsaturated monomer (a) include: as described above, monoesterified products of (meth)acrylic acid and a divalent alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone modified product of the monoesterified products of (meth)acrylic acid and a divalent alcohol having 2 to 8 carbon atoms; allyl alcohols; and (meth)acrylates having a polyoxyethylene chain having a hydroxy group at the molecular end thereof. These may be used alone or in combination of two or more thereof.

The above-mentioned hydroxy group-containing polymerizable unsaturated monomer (a) can generally be used in the range of 1 to 35% by mass, preferably 2 to 25% by mass, and more preferably 3 to 20% by mass, based on the total mass of the monomer (a) and the monomer (b).

Furthermore, a polymerizable unsaturated monomer (b) other than the hydroxy group-containing polymerizable unsaturated monomers (a) described above can be used as the polymerizable unsaturated monomer (b) other than the hydroxy group-containing polymerizable unsaturated monomer (a). These may be used alone or in combination of two or more thereof.

It is suitable that the polymerizable unsaturated monomer (b) other than the above hydroxy group-containing polymerizable unsaturated monomer (a) contain a carboxyl group-containing polymerizable unsaturated monomer (e) as at least a part of the component from the viewpoint of ensuring smoothness of the coating film to be formed.

Examples of the above-mentioned carboxyl group-containing polymerizable unsaturated monomer (e) include (meth)acrylic acid, maleic acid, crotonic acid, and $3-carboxyethylacrylate, and among these, (meth)acrylic acid is suitable.

From the viewpoint of stability of the water-dispersible hydroxy group-containing acrylic resin (A') in an aqueous medium and improvement in flip-flop property and adhesiveness of the coating film to be formed, the above-mentioned carboxyl group-containing polymerizable unsaturated monomer (e) is preferably generally used in the range of 1 to 40% by mass, in particular, 1 to 25% by mass, and further particularly 1 to 19% by mass, based on the total mass of the monomer (a) and the monomer (b).

From the viewpoint of chipping resistance and adhesiveness of the coating film to be formed, it is preferable that the water-dispersible hydroxy group-containing acrylic resin (A') have a hydroxy value generally in the range of 1 to 70 mgKOH/g, in particular, 2 to 60 mgKOH/g, and further particularly 5 to 45 mgKOH/g.

Furthermore, it is preferable that the above-mentioned water-dispersible hydroxy group-containing acrylic resin (A') have an acid value generally in the range of 3 to 90 mgKOH/g, in particular, 4 to 70 mgKOH/g, and further particularly 5 to 50 mgKOH/g, from the viewpoint of adhesiveness of the coating film to be formed.

Further, from the viewpoint of improving the flip-flop property and chipping resistance of the coating film to be formed, it is preferable that a polymerizable unsaturated monomer having only one polymerizable unsaturated groups per molecule is used as the monomer (a), the monomer (b), and the monomer (e), and the shell of the above-mentioned water-dispersible hydroxy group-containing acrylic resin (A') is made into an uncrosslinked type.

The above water-dispersible hydroxy group-containing acrylic resin (A') can be obtained, for example, by adding a monomer mixture (II) containing 1 to 35% by mass of the hydroxy group-containing polymerizable unsaturated monomer (a) and 65 to 99% by mass of the polymerizable unsaturated monomer (b) other than the monomer (a) into an emulsion obtained by emulsion polymerization of a monomer mixture (I) containing 0.1 to 30% by mass of a polymerizable unsaturated monomer (c) having at least two polymerizable unsaturated groups per molecule and 70 to 99.9% by mass of a polymerizable unsaturated monomer (d) having one polymerizable unsaturated groups per molecule, and further polymerizing the mixture.

Emulsion polymerization of the above monomer mixture can be carried out using a method which itself is known, for example, using a polymerization initiator in the presence of an emulsifier.

An anionic emulsifier or a nonionic emulsifier is suitable as the above emulsifier. Examples of the anionic emulsifier include sodium salts and ammonium salts of organic acids such as alkylsulfonic acid, alkylbenzene sulfonic acid, and alkylphosphoric acid, and the examples of the nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan triolate, and polyoxyethylene sorbitan monolaurate.

A polyoxyalkylene group-containing anionic emulsifier having an anionic group and a polyoxyalkylene group such as a polyoxyethylene group or a polyoxypropylene group per molecule, or a reactive anionic emulsifier having the anionic group and the radically polymerizable unsaturated group per molecule may be used, and among these, a reactive anionic emulsifier is preferably used.

Examples of the above-mentioned reactive anionic emulsifier include sodium salts and ammonium salts of a sulfonic acid compound having a radically polymerizable unsaturated group such as a (meth)allyl group, a (meth)acryloyl group, a propenyl group, and a butenyl group. Among these, ammonium salts of sulfonic acid compounds having radically polymerizable unsaturated groups are preferable because they impart excellent water resistance in the coating film to be formed. Examples of the ammonium salt of the sulfonic acid compound include commercially available products such as "Lathenal S-180A" (product name, manufactured by Kao Corporation).

Among the ammonium salts of the sulfonic acid compound having the above radically polymerizable unsaturated group, an ammonium salt of a sulfonic acid compound having a radically polymerizable unsaturated group and a polyoxyalkylene group is further preferable. Examples of the ammonium salt of a sulfonic acid compound having a radically polymerizable unsaturated group and a polyoxyalkylene group described above include commercially available products such as "Aqualone KH-10" (product name, manufactured by Dai-ichi Kogyo Seiyaku Co., Ltd.), and "SR-1025A" (product name, manufactured by Asahi Denka Co., Ltd.).

The emulsifier may generally be used in the range of 0.1 to 15% by mass, preferably 0.5 to 10% by mass, and more preferably 1 to 5% by mass, based on the total quantity of all monomers used.

The aforementioned polymerization initiator may be any of oil-soluble and water-soluble, and examples thereof include organic peroxides such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropyl carbonate, tert-butyl peroxyacetate, and diisopropylbenzene hydroperoxide; azo compounds such as azobisisobutyronitrile, azobis(2,4-dimethylvaleronitrile), azobis(2-methylpropionitrile), azobis(2-methylbutyronitrile), 4,4'-azobis(4-cyanobutanoic acid), dimethylazobis(2-methylpropionate), azobis[2-methyl-N-(2-hydroxyethyl)-propionamide, azobis{2-methyl-N-[2-(1-hydroxybutyl)]-propionamide}; and persulfate salts such as potassium persulfate, ammonium persulfate, and sodium persulfate. These may be used alone or in combination of two or more thereof.

Furthermore, a reducing agent, for example, a sugar, sodium formaldehyde sulfoxide, or an iron complex may be used in combination with the above polymerization initiator as a redox polymerization system, if necessary.

The above polymerization initiator is preferably generally used in the range of generally 0.1 to 5% by mass, particularly 0.2 to 3% by mass, based on the total mass of all monomers used. The method of adding the polymerization initiator is not particularly limited and may be appropriately selected depending on the type and amount thereof. For example, the polymerization initiator may be contained, in advance, in a monomer mixture or an aqueous medium, may be added collectively at the time of polymerization, or may be added dropwise.

The water-dispersible hydroxy group-containing acrylic resin (A') can be obtained by adding a monomer mixture (II) containing the hydroxy group-containing polymerizable unsaturated monomer (a) and a polymerizable unsaturated monomer (b) other than the monomer (a) to an emulsion obtained as described above, and further polymerizing the mixture.

The above monomer mixture (II) may optionally contain components such as a polymerization initiator, a chain transfer agent, a reducing agent, and an emulsifier, as described above.

Further, though the above monomer mixture (II) can be added dropwise as-is, it is desirable that the monomer mixture (II) be dispersed in an aqueous medium and dropped as a monomer emulsion. In this case, the particle diameter of the monomer emulsion is not particularly limited.

The polymerization of the above monomer mixture (II) can be carried out, for example, by adding the monomer mixture (II), which may be emulsified, to the above emulsion collectively or dropwise, and heating to an appropriate temperature while stirring.

The water-dispersible hydroxy group-containing acrylic resin (A') obtained as described above has a core/shell multilayer structure in which a copolymer (I) formed from the monomer mixture (I) containing a polymerizable unsaturated monomer (c) having at least two polymerizable unsaturated groups per molecule and a polymerizable unsaturated monomer (d) having one polymerizable unsaturated groups per molecule is used as a core, and a copolymer (II) formed from the monomer mixture (II) containing the hydroxy group-containing polymerizable unsaturated monomer (a) and a polymerizable unsaturated monomer (b) other than the monomer (a) is used as a shell.

Furthermore, the above-mentioned water-dispersible hydroxy group-containing acrylic resin (A') may be a resin particle comprising three or more layers by adding a step of carrying out emulsion polymerization by supplying a polymerizable unsaturated monomer (one or a mixture of two or more types) forming another resin layer between the step of obtaining the above copolymer (I) and the step of obtaining the above copolymer (II).

In the present invention, "shell" of the above water-dispersible hydroxy group-containing acrylic resin (A') means a polymer layer present in an outermost layer of resin particles, "core" means a polymer layer of a resin particle inner layer excluding the above shell portion, and "core/shell structure" means a structure having the above core and shell. While the core/shell structure described above is generally a layer structure in which a core is completely coated with a shell, depending on the mass ratio of the core and the shell, the monomer amount of the shell may be insufficient to form a layer structure. In such a case, it is not necessary to have a complete layer structure as described above, and a portion of the core may have a structure in which the shell is coated thereon, or a structure in which a polymerizable unsaturated monomer which is a component of a shell is graft-polymerized on a portion of the core. Furthermore, the concept of the multilayer structure in the core/shell structure described above applies similarly to the case where the multilayer structure is formed in the core in the water-dispersible hydroxy group-containing acrylic resin (A').

The ratio of the copolymer (I) and the copolymer (II) in the above water-dispersible hydroxy group-containing acrylic resin (A') having a core/shell multilayer structure is generally in the range of 10/90 to 90/10, in particular, 50/50 to 85/15, and further particularly 65/35 to 80/20, from the viewpoint of flip-flop property and chipping resistance of the coating film to be formed, in terms of the solid content mass ratio of the copolymer (I)/copolymer (II).

The water-dispersible hydroxy group-containing acrylic resin (A') obtained as described above may generally have an average particle diameter in the range of 10 to 1,000 nm, and in particular, 20 to 500 nm. Note that the average particle diameter of the above-mentioned hydroxy group-containing acrylic resin is a value measured by the Coulter counter method at a measurement temperature of 20° C. This measurement can be carried out using, for example, a "COULTER N4 type" (product name, manufactured by Beckman Coulter).

In order to improve the mechanical stability of the water-dispersed particles of the obtained water-dispersible hydroxy group-containing acrylic resin (A'), it is desirable to neutralize the acidic group such as a carboxyl group possessed by the dispersible hydroxy group-containing acrylic resin (A') with a neutralizing agent. The neutralizing agent is not particularly limited as long as the acidic group can be neutralized, and examples thereof include sodium hydroxide, potassium hydroxide, trimethylamine, 2-(dimethylamino)ethanol, 2-amino-2-methyl-1-propanol, triethylamine, and ammonia water, and these neutralizing agents are preferably used in an amount such that the pH of the aqueous dispersion of the dispersible hydroxy group-containing acrylic resin (A') after neutralization is approximately 6.5 to approximately 9.0.

Furthermore, in the paint composition of the present invention, it is preferable that the hydroxy group-containing acrylic resin (A) contain an acrylic resin (A") having a hydroxy group and a phosphate group from the viewpoint of flip-flop property and chipping resistance of the coating film to be formed.

The acrylic resin (A") having a hydroxy group and a phosphate group described above can be produced by copolymerizing a monomer component composed of the hydroxy group-containing polymerizable unsaturated monomer (a) and the polymerizable unsaturated monomer (xvi) having a phosphate group, and other polymerizable unsaturated monomers to be blended, if necessary, by a method known itself, for example, a solution polymerization method in an organic solvent, an emulsion polymerization method in water, or the like. Among these, a solution polymerization method is suitable.

In the acrylic resin (A") having a hydroxy group and a phosphate group described above, the usage ratio of the hydroxy group-containing polymerizable unsaturated monomer (a), the polymerizable unsaturated monomer (xvi) having a phosphate group, and the other polymerizable unsaturated monomer can be set within the following range based on the total amount of these monomers.

The hydroxy group-containing polymerizable unsaturated monomer (a): 1 to 50 wt %, preferably 2 to 40% by mass, more preferably 3 to 30% by mass,
the phosphate group-containing polymerizable unsaturated monomer (xvi): 1 to 70% by mass, preferably 10 to 55% by mass, more preferably 20 to 45% by mass,
the other polymerizable unsaturated monomer: 0 to 98% by mass, preferably 5 to 85% by mass, more preferably 25 to 80% by mass.

It is preferable that the acrylic resin (A") having a hydroxy group and a phosphate group generally have a hydroxy value within the range of 15 to 200 mgKOH/g, in particular, 20 to 140 mgKOH/g, and further particularly 25 to 100 mgKOH/g.

Furthermore, it is preferable that the acrylic resin (A") having a hydroxy group and a phosphate group described above generally have an acid value in the range of 10 to 200 mgKOH/g, in particular, 40 to 170 mgKOH/g, and further particularly 60 to 150 mgKOH/g.

Further, it is preferred that the acrylic resin (A") having a hydroxy group and a phosphate group described above generally have a weight average molecular weight within the range of 2,000 to 100,000, in particular, 4,000 to 50,000, and further particularly 8,000 to 30,000.

The solid content of the hydroxy group-containing acrylic resin (A) is in the range of 20 to 60 parts by mass, preferably in the range of 20 to 55 parts by mass, and more preferably in the range of 25 to 50 parts by mass, based on 100 parts by mass of the total solid content of the hydroxy group-containing acrylic resin (A), the hydroxy group-containing polyester resin (B), and the amino resin (C) from the viewpoint of flip-flop property and chipping resistance of the coating film to be formed.

[Hydroxy Group-Containing Polyester Resin (B)]

The hydroxy group-containing polyester resin (B) is obtained by condensing a polyol (b-1) having two or more hydroxy groups as an alcohol component and a polycarboxylic acid (b-2) having two or more carboxyl groups as an acid component.

A polyhydric alcohol having two or more hydroxy groups per molecule can be suitably used as the above polyol (b-1). Examples thereof include divalent alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 2-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentylglycol, 1,4-cyclohexanedimethanol, tricyclodecandimethanol, neopentyl glycol hydroxypivalate ester, hydrogenated bisphenol A, hydrogenated bisphenol F, and dimethylolpropionic acid; polylactone diols obtained by adding a lactone compound such as ε-caprolactone to these dihydric alcohols; ester diol compounds such as bis(hydroxyethyl) terephthalate; polyetherdiol compounds such as alkylene oxide adducts of bisphenol A, polyethylene glycol, polypropylene glycol, and polybutylene glycol; trivalent or greater alcohols such as glycerin, trimethylolethane, trimethylolpropane, diglycerin, triglycerin, 1,2,6-hexanetriol, pentaerythritol, dipentaerythritol, tris(2-hydroxyethyl) isocyanuric acid, sorbitol, and mannitol; polylactone polyol compounds obtained by adding a lactone compound such as ε-caprolactone to these trivalent or higher alcohols; and fatty acid esterified products of glycerin.

Furthermore, an alcohol component (b-3) other than the above polyol (b-1) can be used. Such alcohol components include, among others but not limited to, monoalcohols such as methanol, ethanol, propyl alcohol, butyl alcohol, stearyl alcohol, and 2-phenoxyethanol; and alcohol compounds obtained by reacting an acid with monoepoxy compounds such as propylene oxide, butylene oxide, and "Cardura E10" (product name, Momentive Specialty Chemicals, glycidyl ester of synthetic high-branching saturated fatty acids).

As the polycarboxylic acid (b-2), compounds commonly used in the production of the hydroxy group-containing polyester resin (B) can be used. Examples of such a polycarboxylic acid (b-2) include aliphatic polybasic acids, alicyclic polybasic acids, and aromatic polybasic acids.

The aliphatic polybasic acid is generally an aliphatic compound having two or more carboxyl groups per molecule, an acid anhydride of the aliphatic compound, or an esterified product of the aliphatic compound. Examples of the aliphatic polybasic acid include aliphatic polyvalent carboxylic acids such as succinic acid, glutaric acid, adipic acid, pimelic acid, suberic acid, azelaic acid, sebacic acid, undecanedioic acid, dodecanediic acid, brusilic acid, octadecanedioic acid, citric acid, and butanetetracarboxylic acid; anhydrides of the aliphatic polyvalent carboxylic acid; and lower alkyl (1 to 6, preferably 1 to 4, carbon atoms) esterified products of the aliphatic polyvalent carboxylic acid. These aliphatic polybasic acids may be used alone or in combination of two or more thereof.

The above alicyclic polybasic acid is generally a compound having one or more alicyclic structures and two or more carboxyl groups per molecule, an acid anhydride of the compound, or an esterified product of the compound. Alicyclic structures can be predominantly 4- to 6-membered ring structures. Examples of the alicyclic polybasic acids include alicyclic polycarboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, and 1,3,5-cyclohexanetricarboxylic acid; anhydrides of the alicyclic polycarboxylic acids; and lower alkyl (1 to 6, preferably 1 to 4, carbon atoms) esterified products of the alicyclic polycarboxylic acids. These alicyclic polybasic acids may be used alone or in combination of two or more thereof. As the alicyclic polybasic acid, it is preferable to use at least one aliphatic polybasic acid selected from 1,2-cyclohexanedicarboxylic acid, 1,2-cyclohexanedicarboxylic acid anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride from the viewpoint of chipping resistance and adhesion of the coating film to be formed, and among others, it is more preferable to use 1,2-cyclohexanedicarboxylic acid and/or 1,2-cyclohexanedicarboxylic acid anhydride.

The above-mentioned aromatic polybasic acid is generally an aromatic compound having two or more carboxyl groups per molecule, an acid anhydride of the aromatic compound, or an esterified product of the aromatic compound. Aromatic polybasic acids include, for example, aromatic polyvalent carboxylic acids such as phthalic acid, isophthalic acid, terephthalic acid, naphthalenedicarboxylic acid, 4,4'-biphenyldicarboxylic acid, trimellitic acid, and pyromellitic acid; anhydrides of the aromatic polyvalent carboxylic acids; lower alkyl (1 to 6, preferably 1 to 4, carbon atoms), and esterified products of the aromatic polyvalent carboxylic acids. These aromatic polybasic acids may be used alone or in combination of two or more thereof. As the above-mentioned aromatic polybasic acid, phthalic acid, phthalic anhydride, isophthalic acid, trimellitic acid, and trimellitic anhydride are preferably used. Among these, trimellitic anhydride is more preferably used.

An acid component (b-4) other than the above aliphatic polybasic acid, the alicyclic polybasic acid, and the aromatic polybasic acid can also be used. Such acid components are not particularly limited, and include, for example, fatty acids such as coconut oil fatty acids, cottonseed oil fatty acids, hemp oil fatty acids, rice bran oil fatty acids, fish oil fatty acids, tall oil fatty acids, soybean oil fatty acids, linseed oil fatty acids, tung oil fatty acids, rapeseed oil fatty acids, castor oil fatty acids, dehydrated castor oil fatty acids, and safflower oil fatty acids; monocarboxylic acids such as lauric acid, myristic acid, palmitic acid, stearic acid, oleic acid, linoleic acid, linolenic acid, benzoic acid, p-tert-butylbenzoic acid, cyclohexanoic acid, and 10-phenyloctadecanoic acid; hydroxycarboxylic acids such as lactic acid, 3-hydroxybutanoic acid, and 3-hydroxy-4-ethoxybenzoic. These acid components may be used alone or in combination of two or more thereof.

The method for producing the hydroxy group-containing polyester (B) is not particularly limited and can be carried out according to conventional methods. For example, the hydroxy group-containing polyester resin (B) can be produced by a method in which the acid component and the alcohol component are heated at approximately 150 to 250° C. in a nitrogen stream for approximately 5 to 10 hours, and an esterification reaction or a transesterification reaction of the acid component and the alcohol component is carried out.

When the above acid component and the above alcohol component are subjected to an esterification reaction or a transesterification reaction, these components may be added to the reaction vessel at once, or one or both may be added in several portions. Further, first, a hydroxy group-containing polyester resin may be synthesized, and then the obtained hydroxy group-containing polyester resin may be subjected to half esterification by reacting an acid anhydride with the obtained hydroxy group-containing polyester resin to form a carboxyl group- and a hydroxy group-containing polyester resin. Further, first, a carboxyl group-containing polyester resin may be synthesized, and then the above-mentioned alcohol component may be added to produce the above-mentioned hydroxy group-containing polyester resin (B).

In the esterification or transesterification reaction, a catalyst which itself is known such as dibutyltin oxide, antimony trioxide, zinc acetate, manganese acetate, cobalt acetate, calcium acetate, lead acetate, tetrabutyltitanate, or tetraisopropyltitanate can be used as a catalyst for accelerating the reaction.

Further, the hydroxy group-containing polyester resin (B) can be modified with a fatty acid, a monoepoxy compound, or a polyisocyanate compound during or after production of the resin.

Examples of the above fatty acids include coconut oil fatty acids, cottonseed oil fatty acids, hemp seed oil fatty acids, rice bran oil fatty acids, fish oil fatty acids, tall oil fatty acids, soybean oil fatty acids, linseed oil fatty acids, tung oil fatty acids, rapeseed oil fatty acids, castor oil fatty acids, dehydrated castor oil fatty acids, safflower oil fatty acids, and the like, and as the above-mentioned monoepoxy compound, for example, "Cardura E10P" (product name, manufactured by Momentive Specialty Chemicals; glycidyl ester of synthetic branch saturated fatty acids) can be suitably used.

Examples of the polyisocyanate compound include aliphatic diisocyanate compounds such as lysine diisocyanate, hexamethylene diisocyanate, and trimethyl hexane diisocyanate; alicyclic diisocyanate compounds such as hydrogenated xylylene diisocyanate, isophorone diisocyanate, methylcyclohexane-2,4-diisocyanate, methylcyclohexane-2,6-diisocyanate, 4,4'-methylenebis (cyclohexylisocyanate), and 1,3-(isocyanatomethyl) cyclohexane; aromatic diisocyanate compounds such as tolylene diisocyanate, xylylene diisocyanate, and diphenylmethane diisocyanate; organic polyisocyanates themselves such as a trivalent or higher valent polyisocyanate such as lysine triisocyanate; adducts of each of these organic polyisocyanates with polyhydric alcohols, low molecular weight polyester resins, and water; cyclized polymers (for example, isocyanurate) of these organic polyisocyanates, and biuret-type adducts. These polyisocyanate compounds may be used alone or as a mixture of two or more thereof.

From the viewpoint of chipping resistance and adhesion of the coating film to be formed, it is preferable that the hydroxy group-containing polyester resin (B) generally have a hydroxy value in the range of 1 to 200 mgKOH/g, in particular, 2 to 180 mgKOH/g, and further particularly 5 to 170 mgKOH/g.

Furthermore, it is preferable that the hydroxy group-containing polyester resin (B) generally have a number average molecular weight in the range of 500 to 50,000, in particular, 1,000 to 30,000, and further particularly 1,200 to 10,000, from the viewpoint of chipping resistance and adhesion of the coating film to be formed.

Furthermore, from the viewpoint of graininess, chipping resistance, and adhesion of the coating film to be formed, it is preferable that the glass transition temperature (Tg) of the hydroxy group-containing polyester resin (B) generally be in the range of −20° C. to 5° C., in particular, −20° C. to 0° C., and further particularly −20° C. to −5° C.

When the paint composition of the present invention is an aqueous coating material, the above-mentioned hydroxy group-containing polyester resin (B) preferably has a carboxyl group, and in this case, it is suitable that the hydroxy group-containing polyester resin (B) generally have an acid value in the range of 5 to 150 mgKOH/g, in particular, 10 to 100 mgKOH/g, and further particularly 15 to 80 mgKOH/g.

The solid content of the above hydroxy group-containing polyester resin (B) is 10 parts by mass or more, preferably 13 parts by mass or more, and more preferably 15 parts by mass or more, with respect to 100 parts by mass of the total solid content of the hydroxy group-containing acrylic resin (A), the hydroxy group-containing polyester resin (B), and the amino resin (C), from the viewpoint of the flip-flop property, chipping resistance, and adhesiveness of the coating film to be formed, and is 50 parts by mass or less, preferably 45 parts by mass or less, and more preferably 40 parts by mass or less from the viewpoint of adhesiveness of the coating film to be formed.

[Amino Resin (C)]

A partially methylolated amino resin or a fully methylolated amino resin obtained by reacting an amino component with an aldehyde component can be used as the amino resin. Examples of the amino component include melamine, urea, benzoguanamine, acetoguanamine, steroguanamine, spiroguanamine, and dicyandiamide. Examples of the aldehyde component include formaldehyde, paraformaldehyde, acetaldehyde, and benzaldehyde.

The methylol groups of the above methylolated amino resin may be partially or completely etherified with an appropriate alcohol. Examples of the alcohol which can be used for etherification include methyl alcohol, ethyl alcohol, n-propyl alcohol, isopropyl alcohol, n-butyl alcohol, isobutyl alcohol, 2-ethyl-1-butanol, and 2-ethyl-1-hexanol.

As the amino resin (C), a melamine resin is preferred. In particular, methyl etherified melamine resins in which the methylol groups of the partially or fully methylolated melamine resin are partially or completely etherified with methyl alcohol, butyl etherified melamine resins in which the methylol groups of the partially or fully methylolated melamine resin are partially or completely etherified with butyl alcohol, methyl-butyl mixed etherified melamine resins in which the methylol groups of the partially or fully methylolated melamine resin are partially or completely etherified with methyl alcohol and butyl alcohol are preferred, and methyl-butyl mixed etherified melamine resins are more preferred.

It is also preferable that the melamine resin have a weight average molecular weight generally within the range of 450 to 6,000, in particular, 500 to 4,000, and even further particularly 550 to 3,000.

As the melamine resin, a commercially available product can be used, and specific examples thereof include "Cymel 202", "Cymel 203", "Cymel 204", "Cymel 211", "Cymel 238", "Cymel 250", "Cymel 251", "Cymel 303", "Cymel 323", "Cymel 324", "Cymel 325", "Cymel 327", "Cymel 350", "Cymel 385", "Cymel 1156", "Cymel 1158", "Cymel 1116", "Cymel 1130" (manufactured by Allnex Japan), and "U-Van 120", "U-Van 20HS", "U-Van 20SE60", "U-Van 2021", "U-Van 2028", "U-Van 28-60" (manufactured by Mitsui Chemicals, Inc.).

The solid content of the amino resin (C) is in the range of 5 to 40 parts by mass, preferably in the range of 8 to 35 parts by mass, and more preferably in the range of 8 to 30 parts by mass, from the viewpoint of the flip-flop property, chipping resistance, and adhesiveness of the coating film to be formed, based on 100 parts by mass of the total solid content of the hydroxy group-containing acrylic resin (A), the hydroxy group-containing polyester resin (B), and the amino resin (C).

[Titanium Oxide-Coated Light Interference Pigment (D) Having L*15 Value of 100 or More and L*110 Value of 65 or Less]

In the present invention, a titanium oxide-coated light interference pigment (D) having an L*15 value of 100 or more and an L*110 value of 65 or less is used.

The titanium oxide-coated light interference pigment is a pigment in which a surface of a transparent or translucent scale-like substrate such as natural mica, synthetic mica, glass, iron oxide, aluminum oxide, or various metal oxides is coated with titanium oxide.

In the present invention, the L*15 value of the light interference pigment is an L* value for light for a coating film obtained by coating a coating material containing only the light interference pigment as a pigment, and irradiating with a standard optical D65 from an angle of 45 degrees with respect to an axis perpendicular to the measurement target using a multi-angle spectrophotometric system, and received light at an angle of 15 degrees in the direction of the measurement light from the regular reflection angle, and the L*110 value of the light interference pigment is an L* value for light which is similarly irradiated with measurement light and received light at an angle of 110 degrees in the direction of the measurement light from the regular reflection angle. As the multi-angle spectrophotometric system, for example, "MA-68II" (product name, manufactured by X-Rite) can be used.

The L*15 value and L*110 value of the above-mentioned light interference pigment can be specifically measured as follows. First, 15 parts by mass of a light interference pigment is blended into 100 parts by mass (solid content) of a resin component composed of 70 parts by mass of a hydroxy group-containing acrylic resin (hydroxy value 100, number average molecular weight 20,000) and 30 parts by mass of a melamine resin, stirred and mixed, and diluted with an organic solvent to an optimum viscosity for coating to obtain an organic solvent type coating material having a solid content of approximately 25%. Thereafter, the obtained coating material is air spray-coated on a coating plate on which a cured coating film of white (Munsell Chart N-9) is previously formed so that the film thickness of the cured coating film becomes 13 m, left at room temperature for 15 minutes, and then heated at 140° C. for 30 minutes using a hot air dryer to obtain a cured coating film. Next, regarding the obtained cured coating film, using an "MA-68II" (product name, manufactured by X-lite; multi-angle spectrophotometric system) and a standard light D65 is irradiated from an angle of 450 with respect to an axis perpendicular to the surface of the cured coating film, the L* value (L*15) of a light receiving angle of 15 degrees and the L* value (L*110) of a light receiving angle of 110 degrees, which is obtained based on the spectral reflectance, is measured for light received at an angle of 15 degrees and 110 degrees in the direction of the measurement light from the regular reflection angle of the reflected light.

Specific examples of the titanium oxide-coated light interference pigment (D) having an L*15 value of 100 or more and an L*110 value of 65 or less include the titanium oxide-coated mica pigments (D1) having an L*15 value of 100 or more and an L*110 value of 65 or less and the titanium oxide-coated aluminum oxide pigments (D2) having an L*15 value of 100 or more and an L*110 value of 65 or less illustrated below.

Among these, from the viewpoint of chipping resistance the coating film to be formed, it is preferable that the titanium oxide-coated light interference pigment (D) having an L*15 value of 100 or more and an L*110 value of 65 or less contain at least one titanium oxide-coated mica pigment (D1) having an L*15 value of 100 or more and an L*110 value of 65 or less.

[Titanium Oxide-Coated Mica Pigment (D1) Having an L*15 Value of 100 or More and an L*110 Value of 65 or Less]

The titanium oxide-coated mica pigment (D1) having an L*15 value of 100 or more and an L*110 value of 65 or less is a pigment in which natural mica and/or synthetic mica is used as a substrate and the surface of the substrate is coated with titanium oxide. Natural mica is a scale-like base material obtained by crushing mica ore. Synthetic mica is synthesized by heating industrial raw materials such as $SiO_2$, MgO, $Al_2O_3$, $K_2SiF_6$, and $Na_2SiF_6$, fusing at a high temperature of approximately 1500° C., cooling, and crystalizing. As compared with natural mica, synthetic mica has fewer contaminants, is uniform in size and thickness, and high in whiteness. Specific examples of the substrate of the synthetic mica include fluorine gold mica ($KMg_3AlSi_3O_{10}F_2$), potassium tetrasilicon mica ($KMg_{2.5}AlSi_4O_{10}F_2$), sodium tetrasilicon mica ($NaMg_{2.5}AlSi_4O_{10}F_2$), Na teniolite ($NaMg_2LiSi_4O_{10}F$), and LiNa teniolite ($LiMg_2LiSi_4O_{10}F_2$).

Examples of the titanium oxide-coated mica pigment (D1) having an L*15 value of 100 or more and an L*110 value of 65 or less include titanium oxide and iron oxide-coated mica pigment (D11) having an L*15 value of 100 or more and an L*110 value of 65 or less, and a low-order titanium oxide-coated mica pigment (D12) having an L*15 value of 100 or more and an L*110 value of 65 or less. In the present specification, the low-order titanium oxide is one represented by the general formula $TiO_x$ (x=1 to 1.99).

In the present invention, when the titanium oxide-coated mica pigment (D1) having an L*15 value of 100 or more and an L*110 value of 65 or less described above is used as the titanium oxide-coated light interference pigment (D) having an L*15 value of 100 or more and an L*110 value of 65 or less, it is preferable that a titanium oxide and an iron oxide-coated mica pigment (D11) having an L*15 value of 100 or more and an L*110 value of 65 or less described above be included in the titanium oxide-coated mica pigment (D1) having an L*15 value of 100 or more and an L*110 value of 65 or less, from the viewpoint of chipping resistance of the coating film to be formed.

Further, the low-order titanium oxide-coated mica pigment (D12) having an L*15 value of 100 or more and an L*110 value of 65 or less can be obtained, for example, by coating the surface of the natural mica and/or synthetic mica substrate with titanium dioxide and further reducing a portion of the coated titanium dioxide under a low oxygen atmosphere. By changing the coating amount of titanium dioxide or varying the type of reducing agent and the firing temperature in the reduction step, a low lightness bright pigment in a color range of brown to black and blue can be obtained. The color gamut described above is not particularly limited.

As the titanium oxide-coated mica pigment (D1) having an L*15 value of 100 or more and an L*110 value of 65 or less, a commercially available product can be used. Among titanium oxide-coated mica pigments (D1) having an L*15 value of 100 or more and an L*110 value of 65 or less, examples of commercially available products of titanium oxide and iron oxide-coated mica pigment (D11) having an L*15 value of 100 or more and an L*110 value of 65 or less include "IRIODIN 9602 Silver-Grey SW" (product name, manufactured by MERCK & Co.), "Iriodon 9612 Silver-Grey Fine Stain SW" (product name, manufactured by MERCK & Co.), and "Symic OEM Medium Opaque Silver" (product name, manufactured by Eckart).

Further, examples of commercially available products of the low-order titanium oxide-coated mica pigment (D12) having an L*15 value of 100 or more and an L*110 value of 65 or less include "IRIODIN 605WNT" (product name, manufactured by MERCK & Co.).

[Titanium Oxide-Coated Aluminum Oxide Pigment (D2) Having L*15 Value of 100 or More and L*110 Value of 65 or Less]

The titanium oxide-coated aluminum oxide pigment (D2) having an L*15 value of 100 or more and an L*110 value of 65 or less is a pigment in which aluminum oxide is used as a substrate and a surface of the substrate is coated with titanium oxide. Note that the aluminum oxide substrate may contain an oxide of another metal.

Examples of the titanium oxide-coated aluminum oxide pigment (D2) having an L*15 value of 100 or more and an L*110 value of 65 or less include titanium oxide and iron oxide-coated aluminum oxide pigments (D21) having an L*15 value of 100 or more and an L*110 value of 65 or less, and low-order titanium oxide coated aluminum oxide pigments (D22) having an L*15 value of 100 or more and an L*110 value of 65 or less.

The low-order titanium oxide coated aluminum oxide pigment (D22) having the above L* value of 100 or more and an L*110 value of 65 or less can be obtained, for example, by coating the surface of an aluminum oxide substrate with titanium dioxide and further reducing a portion of the coated titanium dioxide under a low oxygen atmosphere. By changing the coating amount of titanium dioxide or varying the type of reducing agent and the firing temperature in the reduction step, a low lightness bright pigment in a color range of brown to black and blue can be obtained. The color gamut described above is not particularly limited.

As the titanium oxide-coated aluminum oxide pigment (D2) having an L*15 value of 100 or more and an L*110 value of 65 or less, a commercially available product can be used. Among titanium oxide-coated aluminum oxide pigments (D2) having an L*15 value of 100 or more and an L*110 value of 65 or less, examples of commercially available products of titanium oxide and iron oxide-coated aluminum oxide pigments (D21) having an L*15 value of 100 or more and an L*110 value of 65 or less include "Xirallic NXT M260-60 WNT Panthera Silver" (product name, manufactured by MERCK & Co.).

The solid content of the titanium oxide-coated light interference pigment (D) having an L*15 value of 100 or more and an L*110 value of 65 or less is 3 parts by mass or more, preferably 4 parts by mass or more, and more preferably 6 parts by mass or more based on 100 parts by mass of the total solid content of the hydroxy group-containing acrylic resin (A), the hydroxy group-containing polyester resin (B), and the amino resin (C) from the viewpoint of the graininess, flip-flop property, chipping resistance, and adhesion of the coating film to be formed, and is 25 parts by mass or less, preferably 20 parts by mass or less, and more preferably 17 parts by mass or less from the viewpoint of graininess and adhesiveness of the coating film to be formed.

[Scale-Like Aluminum Pigment (E)]

From the viewpoint of improving the flip-flop property of the coating film to be formed, the paint composition of the present invention further preferably contains a scale-like aluminum pigment (E).

Examples of the scale-like aluminum pigment (E) described above include a milled scale-like aluminum pigment (E) produced by grinding aluminum in a ball mill or an attritor mill in the presence of a grinding medium liquid using a grinding aid.

As the grinding aid in the manufacturing process of the milled scale-like aluminum pigment (E), in addition to higher fatty acids such as oleic acid, stearic acid, isostearic acid, lauric acid, palmitic acid, and myristic acid, aliphatic amines, aliphatic amides, and aliphatic alcohols can be used. Aliphatic hydrocarbons such as mineral spirits are used as the grinding medium liquid.

Furthermore, the milled scale-like aluminum pigment (E) can be roughly divided into a leafing-type and a non-leafing-type depending on the type of the grinding aid.

When blended into the paint composition, the leafing-type type is arranged (leafing) on the surface of the coating film obtained by applying the paint composition, whereby a strong metallic finish is obtained, a heat reflecting action is brought about, and a rust prevention force is exerted. Thus, the leafing-type type is often used in tanks, ducts, and pipes, factory equipment such as rooftop roofing, and various building materials.

Though a product which has not particularly been surface-treated can be used as the scale-like aluminum pigment (E), products having a surface coated with resin, products which have been silica-treated, and products having a surface which has been treated with phosphoric acid, molybdic acid, tungstic acid, or a silane coupling agent can be used. From the above various surface treatments, though a product which has been subjected to one type of treatment can be used, a product which has been subjected to a plurality of types of treatment may be used. From the viewpoint of storage stability of the coating material and chipping resistance of the formed coating film, a scale-like silica-treated aluminum pigment (E1) having a silica-treated surface is preferable.

Further, as the scale-like aluminum pigment (E) described above, a scale-like colored aluminum pigment may be used. Examples of the scale-like colored aluminum pigment include products obtained by further coating a colored pigment on the surface of the scale-like aluminum pigment (E) with a resin coating, and products obtained by coating the surface of the scale-like aluminum pigment (E) with a metal oxide such as iron oxide.

In the present invention, it is preferable that the scale-like aluminum pigment (E) described above not be colored from the viewpoint of the flip-flop property of the coating film to be formed.

When the non-colored scale-like aluminum pigment is used as the scale-like aluminum pigment (E), the content ratio of the non-colored scale-like aluminum pigment is suitably in the range of 60 to 100% by mass, preferably 80 to 100% by mass, and more preferably 90 to 100% by mass, based on the scale-like aluminum pigment (E) in the present paint composition.

When the paint composition of the present invention contains the scale-like aluminum pigment (E), the content ratio (D)/(E) of the titanium oxide-coated light interference pigment (D) having an L*15 value of 100 or more and an L*110 value of 65 or less to the scale-like aluminum pigment (E) is preferably 99/1 or less, more preferably 80/20 or less, particularly preferably 75/25 or less from the viewpoint of the graininess of the coating film to be formed, and is more preferably 10/90 or more, further preferably 20/80 or more, even more preferably 50/50 or more, and still further particularly preferably 60/40 or more from the viewpoint of chipping resistance of the coating film to be formed.

Furthermore, the total solid content of the titanium oxide coated light interference pigment (D) having an L*15 value of 100 or more and an L*110 value of 65 or less and the scale-like aluminum pigment (E) is 6 parts by mass or more, preferably 8 parts by mass or more, and more preferably 10 parts by mass or more based on 100 parts by mass of the total solid content of the hydroxy group-containing acrylic resin (A), the hydroxy group-containing polyester resin (B), and the amino resin (C), from the viewpoint of the flip-flop property and adhesiveness of the coating film to be formed, and is 25 parts by mass or less, preferably 22 parts by mass or less, and more preferably 20 parts by mass or less from the viewpoint of adhesiveness of the coating film to be formed.

[Other Components (F)]

The paint composition of the present invention may further contain, if necessary, a resin component other than the hydroxy group-containing acrylic resin (A) and the hydroxy group-containing polyester resin (B), a curing agent other than the amino resin (C), and conventional paint additives such as an organic solvent, a coloring pigment, an extender pigment, a thickener, a curing catalyst, an ultraviolet absorber, a light stabilizer, a defoaming agent, a plasticizer, a surface modifier, and a sedimentation inhibitor alone or in combination of two or more thereof.

As the resin component other than the hydroxy group-containing acrylic resin (A) and the hydroxy group-containing polyester resin (B) described above, for example, a polyurethane resin can be used.

For example, the polyurethane resin may be obtained as follows: Aliphatic and/or alicyclic diisocyanates; at least one diol selected from the group consisting of polyether diols, polyester diols, and polycarbonate diols; a low molecular weight polyhydroxy compound, and dimethylol alkanoic acid are reacted to prepare a urethane prepolymer, which is neutralized with a tertiary amine, emulsified and dispersed in water, and then, if necessary, mixed with an aqueous medium containing a chain extender such as a polyamine, a crosslinking agent, and/or a terminator to react until the isocyanate group is substantially eliminated.

As the above-mentioned polyurethane resin, a water-dispersible hydroxy group-containing polyurethane resin having an average particle diameter of approximately 0.001 to approximately 3 m can generally be used.

For example, "U-Coat UX-485" (product name, manufactured by Sanyo Chemical, Ltd.) is a commercial product of the polyurethane resin.

As the curing agent other than the amino resin (C), a compound containing a functional group capable of curing the paint composition of the present invention by reacting with a hydroxy group present in a base resin and a crosslinkable functional group such as a carboxyl group or an epoxy group which may be optionally present can be used. Examples of the curing agent other than the amino resin (C) include a polyisocyanate compound, a blocked polyisocyanate compound, a carbodiimide group-containing compound, an epoxy group-containing compound, and a carboxyl group-containing compound. These may be used alone or in combination of two or more thereof.

Among these, as the curing agent other than the above-mentioned amino resin (C), a polyisocyanate compound and a blocked polyisocyanate compound are preferable from the viewpoint of chipping resistance and adhesion of a coating film to be formed, and further, a blocked polyisocyanate compound is particularly preferable from the viewpoint of storage stability of the obtained coating material.

The polyisocyanate compound is a compound having at least two isocyanate groups per molecule, and examples thereof include aliphatic polyisocyanates, alicyclic polyisocyanates, aromatic aliphatic polyisocyanates, aromatic polyisocyanates, and derivatives of the polyisocyanates.

Examples of the aliphatic polyisocyanate include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimeric acid diisocyanate, and 2,6-diisocyanatohexanoic acid methyl (common name: lysine diisocyanate); and aliphatic triisocyanates such as 2,6-diisocyanatohexanoic acid 2-isocyanatoethyl, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the alicyclic polyisocyanate include alicyclic diisocyanates such as 1,3-cyclopentenediisocyanate, 1,4-cyclohexanediisocyanate, 1,3-cyclohexanediisocyanate, 3-isocyanatomethyl-3,5,5-trimethylcyclohexylisocyanate (common name: isophorone diisocyanate), methyl-2,4-cyclohexanediisocyanate, methyl-2,6-cyclohexanediisocyanate, 1,3- or 1,4-bis(isocyanatomethyl)cyclohexane (common name: hydrogenated xylylene diisocyanate), or mixtures thereof, and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-2-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane.

Examples of the aromatic aliphatic polyisocyanate include aromatic aliphatic diisocyanates such as 1,3- or 1,4-xylylenediisocyanate or a mixture thereof, ω,ω'-diisocyanato-1,4-diethylbenzene, 1,3- or 1,4-bis(1-isocyanato-1-methylethyl)benzene (common name: tetramethylxylylene diisocyanate) or a mixture thereof; and aromatic aliphatic triisocyanates such as 1,3,5-triisocyanatomethylbenzene.

Examples of the aromatic polyisocyanate include aromatic diisocyanates, such as m-phenylenediisocyanate, p-phenylenediisocyanate, 4,4'-diphenyldiisocyanate, 1,5-naphthalenediisocyanate, 2,4'- or 4,4'-diphenylmethane diisocyanate or a mixture thereof, 2,4- or 2,6-tolylenediisocyanate or a mixture thereof, 4,4'-toluidine diisocyanate, and 4,4'-diphenylether diisocyanate; aromatic triisocyanates such as triphenylmethane-4,4',4"-triisocyanate, 1,3,5-triisocyanatobenzene, and 2,4,6-triisocyanatotoluene; and aromatic tetraisocyanates such as 4,4'-diphenylmethane-2,2',5,5'-tetraisocyanate.

Examples of the polyisocyanate derivatives include dimers and trimers of the polyisocyanate compound described above, biurette, allophanate, urethodione, uretoimine, isocyanurate, oxadiazintrione, polymethylene polyphenyl polyisocyanate (crude MDI, polymeric MDI), and crude TDI.

These polyisocyanates and derivatives thereof may be used alone or in combination of two or more thereof. Among these polyisocyanates, an aliphatic diisocyanate, an alicyclic diisocyanate and a derivative thereof are suitably used alone or in combination of two or more.

Further, a prepolymer obtained by a urethanization reaction of a polyisocyanate or a derivative thereof described above with a polyhydric alcohol, a low molecular weight polyester resin, or water in the presence of an excess amount of isocyanate groups can also be used as the polyisocyanate compound.

From the viewpoint of chipping resistance and adhesion of the coating film to be formed, the polyisocyanate compound is preferably used in a ratio in which an equivalent ratio (NCO/OH) of an isocyanate group in the polyisocyanate compound to a hydroxy group in the hydroxy group-containing resin is generally in the range of 0.5 to 2.0, and in particular, 0.8 to 1.5.

The blocked polyisocyanate compound is a compound obtained by blocking isocyanate groups of the above polyisocyanate compound with a blocking agent.

Examples of the blocking agent described above include phenol-based blocking agents such as phenol, cresol, xylenol, nitrophenol, ethylphenol, hydroxydiphenyl, butylphenol, isopropylphenol, nonylphenol, octylphenol, and methyl hydroxybenzoate; lactam-based blocking agents such as ε-caprolactam, δ-valerolactam, γ-butyrolactam, and β-propiolactam; fatty alcohol-based blocking agents such as methanol, ethanol, propyl alcohol, butyl alcohol, amyl alcohol, and lauryl alcohol; ether-based blocking agents such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol-based blocking agents such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime-based blocking agents such as formamide oxime, acetamide oxime, acetoxime, methyl ethyl ketoxime, diacetyl monooxime, benzophenone oxime, and cyclohexane oxime; active methylene-based blocking agents such as dimethyl malonate, diethyl malonate, ethyl acetoacetate, methyl acetoacetate, and acetylacetone; mercaptan-based blocking agents such as butyl mercaptan, tert-butyl mercaptan, hexyl mercaptan, tert-dodecyl mercaptan, 2-mercaptobenzothiazole, thiophenol, methyl thiophenol, and ethyl thiophenol; acid amide-based blocking agents1 such as acetanilide, acetaniside, acetotoluide, acrylamide, methacrylamide, acetic acid amide, stearic acid amide, and benzamide; imide-based blocking agents such as imide succinate, imide phthalate, and imide maleate; amine-based blocking agents such as diphenylamine, phenylnaphthylamine, xylidine, N-phenylxylidine, carbazole, aniline, naphthylamine, butylamine, dibutylamine, and butylphenylamine; imidazole-based blocking agents such as imidazole and 2-ethylimidazole; urea-based blocking agents such as urea, thiourea, ethylene urea, ethylene thiourea, and diphenyl urea; carbamic acid ester-based blocking agents such as N-phenylcarbamic acid phenyl; imine-based blocking agents such as ethyleneimine and propyleneimine; sulfite-based blocking agents such as sodium bisulfite and potassium bisulfite; and azole compounds. Examples of azole compounds include pyrazole or pyrazole derivatives such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives such as imidazole, benzimidazole, 2-methylimidazole, 2-ethylimidazole, and 2-phenylimidazole; and imidazoline derivatives such as 2-methylimidazoline and 2-phenylimidazoline.

Among the blocking agents, oxime-based blocking agents, active methylene-based blocking agents, and pyrazole or pyrazole derivatives are preferred.

Further, as the above blocking agent, a hydroxycarboxylic acid having one or more hydroxy groups and one or more carboxyl groups such as, for example, hydroxypivalic acid and dimethylolpropionic acid can also be used.

When the paint composition of the present invention is an aqueous coating material, a blocked polyisocyanate compound in which an isocyanate group is blocked using the above hydroxycarboxylic acid and a carboxyl group of the hydroxycarboxylic acid is neutralized to impart water dispersibility can suitably be used.

Furthermore, when the paint composition of the present invention contains a base resin having a crosslinkable functional group such as a carboxyl group or an epoxy group, a curing agent having a crosslinkable functional group capable of reacting with the functional group can be used as a curing agent other than the above-mentioned amino resin (C).

Examples of such a curing agent include a carbodiimide group-containing compounds, epoxy group-containing compounds, and carboxyl group-containing compounds, which can react with the above-mentioned crosslinkable functional group, and among these, a polycarbodiimide compound capable of reacting with a carboxyl group is preferred.

The polycarbodiimide compound is a compound having at least two carbodiimide groups per molecule, and may be obtained by, for example, decarbonization of isocyanate groups of an isocyanate group-containing compound.

When the paint composition of the present invention is an aqueous coating material, it is preferable to use a water-soluble or water-dispersible polycarbodiimide compound as the above-mentioned polycarbodiimide compound from the viewpoint of smoothness of the coating film to be formed. As the water-soluble or water-dispersible polycarbodiimide compound, any polycarbodiimide compound which can be stably dissolved or dispersed in an aqueous medium can be used without any particular limitation.

Specifically, for example, commercially available products such as "Carbodilite SV-02", "Carbodilite V-02", "Carbodilite V-02-L2", and "Carbodilite V-04" (product names, all manufactured by Nisshinbo Chemical Inc.) can be used as the water-soluble polycarbodiimide compound described above. Furthermore, commercially available products such as "Carbodilite E-01", and "Carbodilite E-02" (product names, all of which are manufactured by Nisshinbo Chemicals Inc.) can be used as the above-mentioned water-dispersible polycarbodiimide compound.

The above polycarbodiimide compounds may be used alone or in combination of two or more thereof.

Examples of the organic solvent include hydrocarbon-based solvents such as heptane, toluene, octane, and mineral spirits; ester-based solvents such as ethyl acetate, n-butyl acetate, isobutyl acetate, ethylene glycol monomethyl ether acetate, and diethylene glycol monobutyl ether acetate; ketone-based solvents such as methyl ethyl ketone, methyl isobutyl ketone, diisobutyl ketone, and cyclohexanone; alcohol-based solvents such as methanol, ethanol, isopropanol, n-butanol, and sec-butanol; ether-based solvents such as n-butyl ether, dioxane, ethylene glycol monomethyl ether, and ethylene glycol monoethyl ether; and aromatic petroleum-based solvents such as Swazole 310, Swazole 1000, and Swazole 1500 manufactured by Cosmo Oil Company.

Among these, from the viewpoint of improving smoothness of the obtained coating film, it is preferable that the paint composition of the present invention contains a hydrophobic solvent as at least one of the above organic solvents.

As the above-mentioned hydrophobic solvent, it is desirable to use an organic solvent having a dissolved mass of 10 g or less, preferably 5 g or less, and more preferably 1 g or less in 100 g of water at 20° C. Examples of such organic solvents include hydrocarbon solvents such as rubber volatile oil, mineral spirits, toluene, xylene, and solvent naphtha; alcohol-based solvents such as 1-hexanol, 1-octanol, 2-octanol, 2-ethyl-1-hexanol, 1-decanol, benzyl alcohol, ethylene glycol mono 2-ethylhexyl ether, propylene glycol mono n-butyl ether, dipropylene glycol mono-n-butyl ether, tripropylene glycol mono-n-butyl ether, propylene glycol mono2-ethylhexyl ether, and propylene glycol monophenyl ether; ester-based solvents such as n-butyl acetate, isobutyl acetate, isoamyl acetate, methyl amyl acetate, and ethylene glycol monobutyl ether acetate; and ketone-based solvents such as methyl isobutyl ketone, cyclohexanone, ethyl n-amyl ketone, and diisobutyl ketone. These may be used alone or in combination of two or more thereof.

As the hydrophobic solvent, an alcohol-based hydrophobic solvent is preferably used from the viewpoint of smoothness of the obtained coating film. Among these, an alcohol-based hydrophobic solvent having 7 to 14 carbon atoms is preferable, and at least one alcohol-based hydrophobic solvent selected from the group consisting of 1-octanol, 2-octanol, 2-ethyl-1-hexanol, ethylene glycol mono 2-ethylhexyl ether, propylene glycol mono n-butyl ether, and dipropylene glycol mono n-butyl ether is more preferable.

When the paint composition of the present invention contains a hydrophobic solvent, the content of the hydrophobic solvent is generally 10 to 100 parts by mass, in particular, 20 to 80 parts by mass, and further particularly 30 to 60 parts by mass, based on 100 parts by mass of the resin solid content in the paint composition of the present invention.

Examples of the coloring pigment include titanium oxide, zinc flower, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, and diketopyrrolopyrrole-based pigments.

Examples of the extender pigment include talc, clay, kaolin, barium sulfate, barium carbonate, and calcium carbonate.

Examples of the thickener include inorganic thickeners such as silicate, metal silicates, montmorillonite, and colloidal alumina; copolymers of (meth)acrylic acid and (meth) acrylic acid ester, polyacrylic acid-based thickeners such as sodium polyacrylate; associative thickeners having a hydrophilic part and a hydrophobic part per molecule and effectively exhibiting a thickening effect in an aqueous medium due to the hydrophobic part which is adsorbed on the surface of pigment or emulsion particles in a coating material or associates with other hydrophilic parts; fiber element derivative thickeners such as carboxymethyl cellulose, methyl cellulose, hydroxyethyl cellulose, cellulose nanofibers, and cellulose nanocrystals; protein-based thickeners such as casein, sodium caseinate, and ammonium caseinate; alginic acid-based thickeners such as sodium alginate; polyvinyl-based thickeners such as polyvinyl alcohol, polyvinylpyrrolidone, and polyvinylbenzyl ether copolymers; polyether-based thickeners such as pluronic polyether, polyether dialkyl ester, polyether dialkyl ether, and polyether epoxy-modified products; maleic anhydride copolymer-based thickeners such as vinyl methyl ether-partial esters of maleic anhydride copolymers; and polyamide thickeners such as polyamide amine salts.

These thickeners may be used alone or in combination of two or more thereof.

As the above thickener, in particular, a polyacrylic acid-based thickener and/or an associative thickener is suitable.

Examples of the curing catalyst include an organometallic compound, an acid compound, and a basic compound.

Examples of the organometallic compound described above include metal catalysts such as tetraisopropyltitanate, tetrabutyltitanate, lithium acetate, iron (III) acetylacetone, zinc 2-ethylhexanoate, copper acetate, vanadium trichloride, tin octylate, dibutyltin diacetate, dibutyltin dioctate, dibutyltin dilaurate, dibutyltin dimarate, tetrabutyltin, dibutyltin oxide, tetra-n-butyl-1,3-diacetyloxydistanoxane, tetra-n-propyl-1,3-diacetyloxydistanoxane, and tetra-n-butyl-1,3-dilauryloxydistanoxane, and in particular, organotin-based compounds such as tin octylate, dibutyltin diacetate, dibutyltin dilaurate, and distanoxane are preferred.

For example, sulfonic acids such as paratoluenesulfonic acid, dodecylbenzenesulfonic acid, dinonylnaphthalenesulfonic acid, and dinonylnaphthalenedisulfonic acid; alkyl phosphate esters such as monobutyl phosphoric acid, dibutyl phosphoric acid, octyl phosphoric acid, and di-2-ethylhexylphosphoric acid; salts and acid salts of these amines can be used as the acid compound described above.

Examples of the basic compound include compounds such as trimethylamine, triethylamine, dimethylcyclohexylamine, N-tetramethylhexane-1,6-diamine, N-pentamethyldiethylenetriamine, and 2-methyl-1,4-diazabicyclo[2,2,2] octane.

Examples of the ultraviolet absorber include benzotriazole-based absorbers, triazine-based absorbers, salicylic acid derivative-based absorbers, and benzophenone-based absorbers.

Examples of the light stabilizer include hindered amine light stabilizers.

Note that the paint composition of the present invention preferably has a solid content generally in the range of 10 to 90% by mass, preferably 10 to 80% by mass, more preferably 15 to 80% by mass, and even further particularly preferably 20 to 70% by mass.

[Paint Composition Production Method]

The paint composition of the present invention can be prepared by mixing the various components described above into a solvent by a conventional painting means. As the above solvent, for example, an organic solvent or water can be used.

[Painted Product]

The painted product of the present invention is characterized in that a cured coating film obtained by curing the paint composition of the present invention is provided on the painted product.

The cured coating film can be obtained by forming a wet coating film (uncured coating film) by coating the object to be coated with the paint composition of the present invention, and thereafter curing the wet coating film.

The object to be coated is not particularly limited, and examples thereof include the outer shell portions of automobile bodies such as passenger cars, trucks, motorcycles, and buses; automobile parts; the outer shell portion of home electrical appliances such as mobile phones and audio equipment. Among these, the outer shell portion of automobile bodies and automobile components are preferred.

The material of the object to be coated is not particularly limited and examples thereof include metallic materials such as iron, aluminum, brass, copper, tin, stainless steel, galvanized steel, galvanized alloy zinc (Zn—Al, Zn—Ni, Zn—Fe or the like) steel; resins such as polyethylene resin, polypropylene resin, acrylonitrile-butadiene-styrene (ABS) resin, polyamide resin, acrylic resin, vinylidene chloride resin, polycarbonate resin, polyurethane resin, and epoxy resin, and various plastic materials such as FRP; inorganic materials such as glass, cement, concrete; wood; and textile materials such as paper and cloth. Among these, metallic materials and plastic materials are preferred.

The above-mentioned object to be coated may be one in which a metal surface such as a metallic material described above or a vehicle body molded therefrom is subjected to surface treatment such as phosphate treatment, chromate treatment, or composite oxide treatment. Further, the object to be coated may be one in which an undercoat coating film such as an electrodeposition coating material and/or an intermediate coating film is formed on the metal surface.

The method of applying the paint composition of the present invention is not particularly limited, and examples thereof include air spray coating, airless spray coating, rotational atomization coating, and curtain coat coating, and a wet coating film can be formed by these coating methods. Among these, methods such as air spray coating and rotational atomization coating are preferred. The paint may be electrostatically applied if necessary.

The coating amount of the paint composition of the present invention may be, as a cured film thickness, generally, an amount of approximately 0.5 to 80 m, preferably approximately 2 to 70 m, more preferably approximately 5 to 60 m, and further preferably approximately 8 to 55 m.

Curing of the wet coating film can be carried out by coating the object to be coated with the paint composition of the present invention and then heating the paint composition. Heating can be carried out by a known heating means. For example, a drying furnace such as a hot stove, an electric furnace, or an infrared induction heating furnace can be used. The heating temperature is preferably approximately 60 to 180° C., more preferably approximately 70 to 160° C. The heating time is not particularly limited, but is generally preferably approximately 10 to 60 minutes, and more preferably approximately 20 to 40 minutes.

After coating the paint composition of the present invention, it is preferable to carry out preheating or air blowing under heating conditions in which the coating film is not substantially cured from the viewpoint of preventing the occurrence of coating film defects such as foaming before carrying out the above-described heating and curing. The temperature of the preheating is preferably approximately 40 to 100° C., more preferably approximately 50 to 90° C., and further preferably approximately 60 to 80° C. The time of the preheating is preferably approximately 30 seconds to approximately 15 minutes, more preferably approximately 1 to approximately 10 minutes, and further preferably approximately 2 to approximately 5 minutes. Furthermore, the above-mentioned air blowing can generally be carried out by blowing air heated to a room temperature or a temperature of approximately 25° C. to 80° C. for approximately 30 seconds to approximately 15 minutes on the coated surface of the object.

The flip-flop value of the cured coating film formed by the paint composition of the present invention at a film thickness of 15 m is preferably in the range of 2.0 to 30.0

The flip-flop value is more preferably 2.5 or more, further preferably 3.0 or more, and particularly preferably 3.5 or more. Further, the flip-flop value is more preferably 15.0 or less, further preferably 11.0 or less, and particularly preferably 7.0 or less.

Note that, in this specification, the flip-flop value (hereinafter, sometimes referred to as the "FF value") refers to the degree of change in reflected light intensity when the observation angle (light receiving angle) is changed. The FF value is calculated by measuring the L* value (L*15 value) at a light receiving angle of 15 degrees and the L* value (L*110 value) at a light receiving angle of 110 degrees using a multi-angle spectrophotometer (product name "MA-68II", manufactured by X-Rite) and using the following formula. Note that the L* value of the light receiving angle 15 degrees (L*15 value) is specifically an L* value of light received at an angle of 15 degrees in the direction of measurement light from the regular reflection angle when an measurement object plane is irradiated with the measurement light from an angle of 45 degrees with respect to an axis perpendicular to the measurement object plane, and the L* value of the light receiving angle of 110 degrees (L*110 value) is an L* value of light received at an angle of 1100 in the direction of measurement light from the regular reflection angle under the same irradiation with measurement light.

$$FF\ value = L*15\ value / L*110\ value$$

The larger the FF value, the greater the change in L* value (lightness) according to the observation angle (light receiving angle), and more excellent the flip-flop properties.

Furthermore, the granular property value (G value) (measured with a BYK-mac manufactured by BYK-Gardner) of the cured coating film at a film thickness of 15 m is preferably in the range of 1.0 to 4.0, more preferably 1.0 to 3.5, further preferably 1.2 to 3.3, and particularly preferably 1.5 to 3.2 from the viewpoint of graininess of the coating film to be formed.

[Multilayer Coating Film Formation Method]

The paint composition of the present invention can be used for basecoat coating film formation when a multilayer coating film composed of a basecoat coating film and a clearcoat coating film is formed on the above-mentioned object to be coated by a two-coat one-bake method. The coating film formation method in this case can be carried out according to the following method I.

<Method I>

The multilayer coating film formation method comprises the steps of:
(I-1) coating an object to be coated with a basecoat paint composition (Y) to form an uncured basecoat coating film,
(I-2) coating the uncured basecoat coating film with a clearcoat paint composition (Z) to form an uncured clearcoat coating film, and
(I-3) heating the uncured basecoat coating film and the uncured clearcoat coating film to simultaneously cure both films.

The object to be coated in method I above is preferably an automobile body in which an undercoat coating film and/or an intermediate coating film is formed. Further, the above-mentioned uncured coating film includes coating films in a finger-touch dry state and coating films in a semi-cured dry state.

When the above basecoat paint composition (Y) is coated by the two-coat one-bake method of Method I, the coating film thickness thereof is approximately 0.5 to 65 m, preferably approximately 2 to 60 m, more preferably approximately 5 to 55 m, and further preferably approximately 8 to 40 m as a cured film thickness.

Further, although the above-mentioned uncured basecoat coating film is generally formed using one type of basecoat paint composition, it can also be formed using two or more types of basecoat paint composition. In that case, the paint composition of the present invention can be used as a basecoat paint composition for forming at least an uppermost coating film.

When two or more types of paint compositions are used, it is preferable to use two types of paint compositions.

Specifically, for example, the object to be coated may be coated with a first basecoat coating material which may be used in the paint composition of the present invention to form a first basecoat coating film, and thereafter, the first basecoat coating film may be coated with a second basecoat coating material which may be used in the paint composition of the present invention to form a second basecoat coating film.

In this case, from the viewpoint of flip-flop property of the coating film to be formed, the above-mentioned first basecoat coating film is approximately 5 to 35 m, preferably approximately 7 to 27 m as a cured film thickness, and the above-mentioned second basecoat coating film is approximately 5 to 35 m, preferably approximately 7 to 27 m as a cured film thickness.

Further, the coating film thickness of the above clearcoat paint composition (Z) is preferably approximately 10 to 80 m, more preferably approximately 15 to 60 m, as a cured film thickness.

Furthermore, in method I, after coating of the above-mentioned basecoat paint composition (Y), it is preferable to carry out preheating or air blowing under heating conditions in which the coating film is not substantially cured from the viewpoint of preventing the occurrence of coating film defects such as foaming. The temperature of the preheating is preferably approximately 40 to 100° C., more preferably approximately 50 to 90° C., and further preferably approximately 60 to 80° C. The time of preheating is preferably approximately 30 seconds to approximately 15 minutes, more preferably approximately 1 to approximately 10 minutes, and further preferably approximately 2 to approximately 5 minutes. Furthermore, the above-mentioned air blowing can generally be carried out by blowing air heated to room temperature or a temperature of approximately 25° C. to 80° C. for approximately 30 seconds to approximately 15 minutes on a coated surface of an object. Further, after coating of the above clearcoat paint composition (Z), it is possible to set an interval of approximately 1 to 60 minutes at room temperature or to preheat at approximately 40 to 80° C. for approximately 1 to 60 minutes, if necessary.

Curing of the coating film can be carried out by the known heating means. The heating temperature is preferably approximately 60 to 180° C., more preferably approximately 70 to 160° C. Further, the heating time is preferably approximately 10 to 60 minutes, more preferably approximately 20 to 40 minutes. By this heating, both the basecoat coating film and the clearcoat coating film can be cured simultaneously.

Furthermore, the paint composition of the present invention can be suitably used for basecoat formation when a multilayer coating film comprising a colored coating film, a basecoat coating film, and a clearcoat coating film is formed on an object to be coated such as an automobile body by a three-coat one-bake method. The coating film formation method in this case can be carried out according to the following method II <Method II>

The multilayer coating film formation method comprises the steps of:
(II-1) coating an object to be coated with a colored paint composition (X) to form an uncured colored coating film,
(II-2) coating the coating film formed by the uncured colored paint composition (X) with a basecoat paint composition (Y) to form an uncured basecoat coating film,
(II-3) coating the uncured basecoat coating film with a clearcoat paint composition (Z) to form an uncured clearcoat coating film, and
(II-4) heating the uncured colored coating film, the uncured basecoat coating film, and the uncured clearcoat coating film to simultaneously cure them.

In method II above, the coating film formation method of the method I above is carried out on an uncured colored coating film. As the object to be coated in method II, an automobile body in which an undercoat coating film is formed is preferred. The above-mentioned undercoat coating film is preferably formed by an electrodeposition coating material, and is further preferably formed by a cationic electrodeposition coating material.

In method II, the coating film thickness of the colored paint composition (X) is generally preferably approximately 3 to 60 m, more preferably approximately 4 to 40 m, as a cured film thickness. Further, the coating film thickness of the basecoat paint composition (Y) is preferably approximately 0.5 to 65 m, more preferably approximately 2 to 60 m, particularly preferably approximately 5 to 55 m, and most preferably approximately 8 to 40 m as a cured film thickness. Furthermore, the coating film thickness of the clearcoat paint composition (Z) is generally preferably approximately 10 to 80 m, more preferably approximately 15 to 60 m, as a cured film thickness.

Furthermore, in method II, when an aqueous coating material is used as the colored paint composition (X), it is preferable to carry out preheating after coating of the coating material. The temperature of the preheating is preferably approximately 40 to 100° C., more preferably approximately 40 to 90° C., and further preferably approximately 60 to 80° C. The time of preheating is preferably approximately 30 seconds to approximately 15 minutes, more preferably approximately 1 minute to approximately 10 minutes, and further preferably approximately 2 minutes to approximately 5 minutes.

Further, it is preferable to carry out preheating after coating of the basecoat paint composition (Y) described above. The temperature of the preheating is preferably approximately 40 to 100° C., more preferably approximately 40 to 90° C., and further preferably approximately 60 to 80° C. The time of preheating is preferably approximately 30 seconds to approximately 15 minutes, more preferably approximately 1 minute to approximately 10 minutes, and further preferably approximately 2 minutes to approximately 5 minutes.

In method II, the uncured basecoat coating film described above is generally formed using one type of basecoat paint composition, but can also be formed using two or more types of basecoat paint composition. In that case, the paint composition of the present invention can be used as a basecoat paint composition which forms at least an uppermost basecoat coating film.

When two or more types of basecoat paint compositions are used, it is preferable to use two types of basecoat paint composition.

After coating of the above clearcoat paint composition (Z), it is possible to set an interval of approximately 1 to 60 minutes at room temperature or to preheat at approximately 40 to 80° C. for approximately 1 to 60 minutes, if necessary.

Curing of the three-layer coating film composed of the uncured colored coating film, the uncured basecoat coating film, and the uncured clearcoat coating film can be carried out by the known heating means. The heating temperature is preferably approximately 60 to 180° C., more preferably approximately 70 to 160° C. Further, the heating time is preferably approximately 10 to 60 minutes, more preferably approximately 20 to 40 minutes. By this heating, the three-layer coating film composed of the colored coating film, the basecoat coating film, and the clearcoat coating film can be simultaneously cured.

As the clearcoat paint composition (Z) used in the above methods I and II, any known thermosetting clearcoat paint composition for coating an automobile body can be used. Examples thereof include paint compositions comprising a base resin having a crosslinkable functional group or a crosslinking agent, such as an organic solvent-type thermosetting paint composition, an aqueous thermosetting paint composition, or a powder thermosetting paint composition.

Examples of the crosslinkable functional group of the above-mentioned base resin include a carboxyl group, a hydroxy group, an epoxy group, and a silanol group. Examples of the type of the base resin include (meth)acrylic resins, polyester polyol resins, alkyd resins, urethane resins, epoxy resins, and fluororesins. Examples of the crosslinking agent include polyisocyanate compounds, blocked polyisocyanate compounds, melamine resins, urea resins, carboxyl group-containing compounds, carboxyl group-containing resins, epoxy group-containing resins, and epoxy group-containing compounds.

Furthermore, as the above-mentioned clearcoat coating material (Z), a one-liquid type coating material may be used, or a multi-liquid type coating material such as a two-liquid type urethane resin coating material may be used.

Furthermore, if necessary, a coloring pigment, a bright pigment, or a dye can be contained in the above-mentioned clearcoat paint composition (Z) to the extent that transparency is not inhibited, and further, an extender pigment, an ultraviolet absorber, a light stabilizer, a defoaming agent, a thickener, a rust inhibitor, or a surface modifier can be appropriately included.

Examples of the combination of the base resin/crosslinking agent of the clearcoat paint composition (Z) include carboxyl group-containing resin/epoxy group-containing resin, hydroxy group-containing resin/polyisocyanate compound, hydroxy group-containing resin/blocked polyisocyanate compound, and hydroxy group-containing resin/melamine resin.

As a combination of the base resin/crosslinking agent, a hydroxy group-containing resin/polyisocyanate compound and a hydroxy group-containing resin/blocked polyisocyanate compound are suitable from the viewpoint of chipping resistance and adhesiveness of the coating film to be formed, and particularly, a hydroxy group-containing resin/polyisocyanate compound is suitable.

As the colored paint composition (X) used in the above method II, any known thermosetting colored paint composition can be used. For example, a thermosetting paint composition containing a base resin having a crosslinkable functional group, a crosslinking agent, a coloring pigment and an extender pigment can be suitably used.

The colored paint composition (X) used in the above method II can exhibit any color by containing the above colored pigment, but from the viewpoint of flip-flop property of the coating film to be formed, the $L^*110$ value in the $L^*a^*b^*$ color system of the colored coating film formed by the colored paint composition (X) on the object to be coated is preferably in the range of 5 to 80, more preferably in the range of 10 to 50, and particularly preferably in the range of 15 to 40.

The $L^*110$ value of the colored coating film formed by the above colored paint composition is an $L^*$ value for light which is irradiated with a standard light D65 from an angle of 45 degrees with respect to an axis perpendicular to the measurement target using a multi-angle spectrophotometric system for the colored coating film and received light at an angle of 110 degrees in the direction of the measurement light from the regular reflection angle. As the multi-angle spectrophotometric system, for example, "MA-68II" (product name, manufactured by X-Rite) can be used.

The $L^*110$ value of the colored coating film formed by the colored paint composition (X) on the object to be coated can appropriately be adjusted by adjusting the mixing ratio of the colored pigment such as a black pigment or a white pigment in the colored paint composition (X).

Examples of the crosslinkable functional group of the above-mentioned base resin include a carboxyl group, a hydroxy group, and an epoxy group. Examples of the type of the base resin include (meth)acrylic resins, polyester polyol resins, alkyd resins, and urethane resins. Examples of the crosslinking agent include melamine resins, polyisocyanate compounds, and blocked polyisocyanate compounds.

As the colored paint composition, any of an organic solvent type paint composition, an aqueous paint composition, and a powder paint composition may be used. Among these, an aqueous paint composition is preferably used.

In methods I and II above, coating can be coated by a known method, for example, air spray coating, airless spray coating, and a rotational atomization coating.

The $L^*15$ value of the multilayer coating film formed in methods I and II above is preferably in the range of 75 to 140, more preferably in the range of 80 to 135, and particularly preferably in the range of 85 to 130, from the viewpoint of the flip-flop property of the coating film to be formed. Further, the $L^*110$ value is preferably in the range of 3 to 50, more preferably in the range of 4 to 40, and particularly preferably in the range of 5 to 35.

EXAMPLES

Examples will be described below, and thought the present invention will be specifically described, the present invention is not limited thereto in any way. In the examples, "parts" and "%" refer to mass unless otherwise specified. Further, the film thickness of the coating film is based on a cured coating film.

(Production of Hydroxy Group-Containing Acrylic Resin (A))

Production Example 1

In a reaction vessel equipped with a thermometer, a thermostat, a stirring device, a reflux condenser, a N introduction pipe, and a dropping device, 128.0 parts of deionized water and 2.0 parts of "ADEKA REASOAP SR-1025" (product name, ADEKA, emulsifier, active component 25%)

were prepared, stirred and mixed in a nitrogen stream, and the temperature was raised to 80° C.

Thereafter, 1% of the total amount of the core portion monomer emulsion described below and 5.3 parts of a 6% aqueous ammonium persulfate solution were introduced into the reaction vessel and maintained at 80° C. for 15 minutes. Thereafter, the remainder of the core portion monomer emulsion was added dropwise to the reaction vessel maintained at the same temperature over a period of 3 hours, and aging was carried out for 1 hour after completion of the dropping. Next, a shell portion monomer emulsion described below was added dropwise over 1 hour, and after aging for 1 hour, 40.0 parts of a 5% aqueous 2-(dimethylamino)ethanol solution was gradually added to the reaction vessel, cooled to 30° C., and discharged while filtering through a 100-mesh nylon cloth to obtain a water-dispersible hydroxy group-containing acrylic resin (A'-1) dispersion having an average particle diameter of 100 nm and a solid content of 30%. The obtained water-dispersible hydroxy group-containing acrylic resin (A'-1) had an acid value of 33 mgKOH/g and a hydroxy value of 25 mgKOH/g.

Core portion monomer emulsion: 40.0 parts of deionized water, 2.8 parts of "ADEKA REASOAP SR-1025", 2.1 parts of methylenebisacrylamide, 2.8 parts of styrene, 16.1 parts of methyl methacrylate, 28.0 parts of ethyl acrylate, and 21.0 parts of n-butylacrylate were mixed and stirred to obtain a core portion monomer emulsion.

Shell portion monomer emulsion: 17.0 parts of deionized water, 1.2 parts of "ADEKA REASOAP SR-1025", 0.03 parts of ammonium persulfate, 3.0 parts of styrene, 5.1 parts of 2-hydroxylethylacrylate, 5.1 parts of methacrylic acid, 6.0 parts of methyl methacrylate, 1.8 parts of ethyl acrylate and 9.0 parts of n-butylacrylate were mixed and stirred to obtain a shell portion monomer emulsion.

Production Example 2

To a reaction vessel equipped with a thermometer, a thermostat, a stirring device, a reflux condenser, a nitrogen introduction pipe, and a dropping device, a mixed solvent of 27.5 parts of methoxypropanol and 27.5 parts of isobutanol was charged, heated to 110° C., and 121.5 parts of a mixture consisting of 25.0 parts of styrene, 27.5 parts of n-butyl methacrylate, 20.0 parts of "Isostearylacrylate" (product name, manufactured by Osaka Organic Chemical Industry, Ltd., branched higher alkyl acrylate), 7.5 parts of 4-hydroxybutyl acrylate, 15.0 parts of the phosphate group-containing polymerizable monomer described below, 12.5 parts of 2-methacryloyloxyethyl acid phosphate, 10.0 parts of isobutanol, and 4.0 parts of t-butylperoxyoctanoate was added to the above mixed solvent over a period of 4 hours, and a mixture consisting of 0.5 parts of t-butylperoxyoctanoate and 20.0 parts of isopropanol was further added dropwise for 1 hour. Thereafter, the mixture was stirred and aged for 1 hour to obtain an acrylic resin (A"-1) solution having a hydroxy group and a phosphate group and having a solid content of 50%. The obtained acrylic resin (A"-1) having a hydroxy group and a phosphate group had an acid value of 83 mgKOH/g, a hydroxy value of 29 mgKOH/g, and a weight average molecular weight of 10,000.

Phosphate group-containing polymerizable monomer: to a reaction vessel equipped with a thermometer, a thermostat, a stirring device, a reflux condenser, a nitrogen introduction pipe, and a dropping device, 57.5 parts of monobutyl phosphoric acid and 41.0 parts of isobutanol were charged, and after the temperature was raised to 90° C., 42.5 parts of glycidyl methacrylate was added dropwise over 2 hours. Thereafter, the mixture was stirred and aged for an additional 1 hour. Thereafter, 59.0 parts of isopropanol was added to obtain a phosphate group-containing polymerizable monomer solution having a solid concentration of 50%. The acid value of the obtained monomer was 285 mgKOH/g.

(Production of Hydroxy Group-Containing Polyester Resin (B))

Production Example 3

To a reaction vessel equipped with a thermometer, a thermostat, a stirring device, a reflux condenser, and a water separator, 175 parts of trimethylolpropane, 314 parts of neopentylglycol, 281 parts of adipic acid, 177 parts of isophthalic acid, and 99 parts of 1,2-cyclohexanedicarboxylic acid anhydride were charged, and the temperature was increased from 160° C. to 230° C. over 3 hours, and thereafter, the generated condensed water was subjected to a condensation reaction at 230° C. for 4 hours while being distilled off by the water separator. Thereafter, in order to add a carboxyl group to the obtained condensation reaction product, 58 parts of trimellitic anhydride was further added and reacted for 30 minutes at 170° C. An equal amount of 2-(dimethylamino)ethanol was then added to the acid group and neutralized, and deionized water was gradually added and water dispersed to obtain a hydroxy group-containing polyester resin (B-1) having a solid concentration of 45% and a pH of 7.2. The obtained hydroxy group-containing polyester resin had an acid value of 35 mgKOH/g, a hydroxy value of 130 mgKOH/g, a number average molecular weight of 1,425, and a glass transition temperature of −12° C.

Production Examples 4 to 9

Hydroxyl group-containing polyester resins (B-2) to (B-7) were obtained in the same manner as in Production Example 3, except that the blending composition of Production Example 3 was changed as shown in Table 1, which is described later.

TABLE 1

| Production Ex No. | 3 | 4 | 5 | 6 | 7 | 8 | 9 |
|---|---|---|---|---|---|---|---|
| Hydroxy Group-Containing Polyester Resin Name | (B-1) | (B-2) | (B-3) | (B-4) | (B-5) | (B-6) | (B-7) |
| Trimethylolpropane | 175 | 198 | 140 | 140 | 221 | 117 | 169 |
| Neopentyl Glycol | 314 | 296 | 341 | 341 | 278 | 359 | 318 |
| Adipic Acid | 281 | 249 | 374 | 436 | 156 | 468 | 344 |
| Isophthalic Acid | 177 | 213 | 71 | 0 | 269 | 0 | 213 |
| 1,2-Cyclohexane-dicarboxylic Acid Anhydride | 99 | 99 | 98 | 99 | 145 | 66 | 0 |
| Trimellitic acid anhydride | 58 | 107 | 57 | 58 | 57 | 57 | 57 |
| Acid Value [mgKOH/g] | 35 | 62 | 35 | 35 | 35 | 35 | 35 |
| Hydroxy Value [mgKOH/g] | 130 | 118 | 118 | 120 | 147 | 110 | 130 |
| Number Average Molecular Weight | 1425 | 1510 | 1400 | 1385 | 1440 | 1390 | 1470 |
| Glass Transition Temperature [C] | −12 | −7 | −15 | −18 | 7 | −22 | −10 |

(Production of Pigment Dispersion Containing Titanium Oxide-Coated Light Interference Pigment (D) Having L*15 Value of 100 or More and L*110 Value of 65 or Less and Scale-Like Aluminum Pigment (E))

Production Example 10

In a stirring mixing vessel, 8.0 parts of "IRIODON 9612 Silver-Grey Fine Stain SW" (product name, manufactured by MERCK & Co., titanium oxide and iron oxide coated mica pigment, L*15 value=117, L*110 value=58) (Note 1), 8.3 parts (solid content: 5.0 parts) of "STAPA HYDROLAN IL 9160" (product name, manufactured by Eckart, aluminum pigment paste, aluminum content: 60%), 35.0 parts of 2-ethyl-1-hexanol, and 20.0 parts (solid content 10.0 parts) of the acrylic resin (A1"-1) solution having a hydroxy group and a phosphate group obtained in Production Example 2 were uniformly mixed to obtain a pigment dispersion (P-1).

Production Examples 11 to 31, Production Example 36

Pigment dispersions (P-2) to (P-22) and pigment dispersion (P-27) were obtained in the same manner as in Production Example 10, except that the blending composition of Production Example 10 was changed as shown in Table 2, which is described later.
(Production of Pigment Dispersion Containing Scale-Like Aluminum Pigment (E) and Scale-Like Titanate Pigment)

Production Example 32

In a stirring mixing vessel, 8.3 parts (solid content: 5.0 parts) of "STAPA HYDROLAN IL 9160" (product name, manufactured by Eckart, aluminum pigment paste, aluminum content: 60%), 8.0 parts of "Terracess L" (product name, manufactured by Otsuka Chemical Co., Ltd., scale-like titanate pigment), 35.0 parts of 2-ethyl-1-hexanol, and 20.0 parts (solid content: 10.0 parts) of a solution of an acrylic resin (A1"-1) having a hydroxy group and a phosphate group obtained in Production Example 2 were uniformly mixed to obtain a pigment dispersion (P-23).

Production Example 33

In the stirring mixing vessel, 13.3 parts (8.0 parts solid content) of "STAPA HYDROLAN IL 9160" (product name, manufactured by Eckart, aluminum pigment paste, aluminum content 60%), 5.0 parts of "Terracess L" (product name, manufactured by Otsuka Chemical Co., Ltd., scale-like titanate pigment), 35.0 parts of 2-ethyl-1-hexanol, and 20.0 parts (10.0 parts solid content) of the acrylic resin (A1"-1) solution having a hydroxy group and a phosphate group obtained in Production Example 2 were uniformly mixed to obtain a pigment dispersion (P-24).
(Production of Pigment Dispersion Containing Scale-Like Aluminum Pigment (E) and Talc)

Production Example 34

In a stirring mixing vessel, 8.3 parts (solid content: 5.0 parts) of "STAPA HYDROLAN IL 9160" (product name, manufactured by Eckart, aluminum pigment paste, aluminum content: 60%), 8.0 parts of "LMR-100" (product name, talc manufactured by Fuji Talc Industry Co., Ltd.), 35.0 parts of 2-ethyl-1-hexanol, and 20.0 parts (10.0 parts of solid content) of the acrylic resin (A1"-1) solution having a hydroxy group and a phosphate group obtained in Production Example 2 were uniformly mixed to obtain a pigment dispersion (P-25).

Production Example 35

In a stirring mixing vessel, 13.3 parts (solid content: 8.0 parts) of "STAPA HYDROLAN IL 9160" (product name, manufactured by Eckart, aluminum pigment paste, aluminum content: 60%), 5.0 parts of "LMR-100" (product name, manufactured by Fuji Talc Industrial Co., talc), 35.0 parts of 2-ethyl-1-hexanol, and 20.0 parts (solid content: 10.0 parts) of the acrylic resin (A1"-1) solution having a hydroxy group and a phosphate group obtained in Production Example 2 were uniformly mixed to obtain a pigment dispersion (P-26).

TABLE 2-1

| | Production Ex No. | 10 | 11 | 12 | 13 | 14 | 15 | 16 | 17 | 18 | 19 | 20 | 21 | 22 |
|---|---|---|---|---|---|---|---|---|---|---|---|---|---|---|
| | Pigment Dispersion Name | (P-1) | (P-2) | (P-3) | (P-4) | (P-5) | (P-6) | (P-7) | (P-8) | (P-9) | (P-10) | (P-11) | (P-12) | (P-13) |
| Titanium Oxide-Coated Light Interference Pigment (D) Having L*15 Value of 100 or More and L*110 Value of 65 or Less | "IRIODON 9612 Silver-Gray Fine Stain SW" (Note 1) | 8 | 13 | 4 | 2.5 | 24 | 26 | 5 | 3 | 20 | 20 | 3 | 3 | 6 |
| | "SYMIC OEM Medium Opaque Silver" (Note 2) | | | | | | | | | | | | | |
| | "IRIODIN 605WNT" (Note 3) | | | | | | | | | | | | | |
| | "Xirallic NXT M260-60 WNT Panthera Silver" (Note 4) | | | | | | | | | | | | | |
| Titanium Oxide-Coated Light Interference Pigment other than (D) | "Twincle PEARL SXC-SO" (Note 5) | | | | | | | | | | | | | |
| Scale-Like Aluminum Pigment (E) | "STAPA HYDROLAN IL 9160" | 5 | | | | | 2 | 2 | 5 | 8 | 12 | 14 | 6 | |
| | "Terracess L" | | | | | | | | | | | | | |
| | "LMR-100" | | | | | | | | | | | | | |
| Acrylic Resin (A"-1) Having Hydroxy Group and Phosphate Group | | 10 | 10 | 10 | 10 | 10 | 10 | 10 | 10 | 10 | 10 | 10 | 10 | 10 |
| Brightness Material Total | | 13 | 13 | 4 | 2.5 | 24 | 26 | 7 | 5 | 25 | 28 | 15 | 17 | 12 |
| (D)/(E) | | 1.6 | — | — | — | — | — | 2.5 | 1.5 | 4 | 2.5 | 0.25 | 0.21 | 1 |

TABLE 2-2

| | Production Ex No. | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|
| | Pigment Dispersion Name | (P-14) | (P-15) | (P-16) | (P-17) | (P-18) | (P-19) | (P-20) | (P-21) | (P-22) | (P-23) | (P-24) | (P-25) | (P-26) | (P-27) |
| Titanium Oxide-Coated Light Interference Pigment (D) Having L*15 Value of 100 or More and L*110 Value of 65 or Less | "IRIODON 9612 Silver-Gray Fine Stain SW" (Note 1) | 5 | 11 | 13 | 12 | | | | | | | | | | 3 |
| | "SYMIC OEM Medium Opaque Silver" (Note 2) | | | | | | | 8 | | | | | | | |
| | "IRIODIN 605WNT" (Note 3) | | | | | | 8 | | | | | | | | |
| | "Xirallic NXT M260-60 WNT Panthera Silver" (Note 4) | | | | | | | | 8 | 11 | | | | | |
| Titanium Oxide-Coated Light Interference Pigment other than (D) | "Twincle PEARL SXC-SO" (Note 5) | | | | | 8 | | | | | | | | | |
| Scale-Like Aluminum Pigment (E) | "STAPA HYDROLAN IL 9160" | 8 | 3 | 3 | 12 | 5 | 5 | 5 | 5 | 3 | 5 | 8 | 5 | 8 | 21 |
| | "Terracess L" | | | | | | | | | | 8 | 5 | | | |
| | "LMR-100" | | | | | | | | | | | | 8 | 5 | 5 |
| Acrylic Resin (A"-1) Having Hydroxy Group and Phosphate Group | | 10 | 10 | 10 | 10 | 10 | 10 | 10 | 10 | 10 | 10 | 10 | 10 | 10 | 10 |
| Brightness Material Total | | 13 | 14 | 16 | 24 | 13 | 13 | 13 | 13 | 14 | 5 | 8 | 5 | 8 | 24 |
| (D)/(E) | | 0.63 | 3.67 | 4.33 | 1 | — | 1.6 | 1.6 | 1.6 | 3.67 | — | — | — | — | 0.14 |

Note that the pigments in (Note 1) to (Note 5) in Table 2 and Table 3 were used as follows.

(Note 1) "IRIODON 9612 Silver-Grey Fine Stain SW": product name, manufactured by Merck & Co., titanium oxide and iron oxide-coated mica pigment, L*15 value=115, L*110 value=58, (Note 2) "SYMIC OEM Medium Opaque Silver": product name, manufactured by Eckart, titanium oxide and iron oxide coated mica pigment, L*15 value=117, L*110 value=56, (Note 3) "IRIODIN 605WNT": product name, manufactured by Merck & Co., low-order titanium oxide-coated mica pigment, L*15 value=116, L*110 value=62, (Note 4) "Xirallic NXT M260-60WNT Panthera Silver": product name, manufactured by Merck & Co., titanium oxide and iron oxide-coated aluminum oxide pigment, L*15 value=116, L*110 value=56, (Note 5) "TWINCLE PEARL SXC-SO": product name, manufactured by Nihon Koken Kogyo Co., Ltd., titanium oxide-coated synthetic mica pigment, L*15 value=117, L*110 value=73.

(Paint Composition Production)

Example 1

In a stirring mixing vessel, 100 parts (solid content: 30.0 parts) of the water-dispersible hydroxy group-containing acrylic resin (A'-1) aqueous dispersion obtained in Production Example 1, 66.7 parts (solid content: 30.0 parts) of the hydroxy group-containing polyester resin (B-1) obtained in Production Example 3, 37.5 parts (solid content: 30.0 parts) of "Cymel 325" (product name, manufactured by Allnex Japan Co., Ltd., melamine resin, solid content: 80%), and 71.3 parts (solid content: 23.0 parts) of the pigment dispersion (P-1) obtained in Production Example 10 were uniformly mixed, and further, a polyacrylic acid-based thickener (product name "Primal ASE-60" Dow Chemical Co., Ltd.), 2-(dimethylamino)ethanol and deionized water were added to obtain a paint composition (Y-1) having a viscosity of 40 seconds measured by Ford cup No. 4 at a pH 8.0, and a paint solid content of 25%.

Examples 2 to 32 and Comparative Examples 1 to 13

Paint compositions (Y-2) to (Y-45) were obtained in the same manner as in Example 1, except that the blending composition of Example 1 was changed as shown in Table 3, which is described later.

TABLE 3-1

| | | Ex | | | | | | | | | |
|---|---|---|---|---|---|---|---|---|---|---|---|
| | | 1 | 2 | 3 | 4 | 5 | 6 | 7 | 8 | 9 | 10 |
| Paint Composition Name | | (Y-1) | (Y-2) | (Y-3) | (Y-4) | (Y-5) | (Y-6) | (Y-7) | (Y-8) | (Y-9) | (Y-10) |
| Titanium Oxide-Coated Light Interference Pigment | "IRIODON 9612 Silver-Gray Fine Stain SW" (Note 1) | 8 | 13 | 4 | 24 | 5 | 3 | 20 | 20 | 3 | 3 |
| | "SYMIC OEM Medium Opaque Silver" (Note 2) | | | | | | | | | | |

TABLE 3-1-continued

| | | Ex | | | | | | | | | |
|---|---|---|---|---|---|---|---|---|---|---|---|
| | | 1 | 2 | 3 | 4 | 5 | 6 | 7 | 8 | 9 | 10 |
| (D) Titanium Oxide-Coated Light Interference Pigment Having L*15 Value of 100 or More and L*110 Value of 65 or Less | "IRIODIN 605WNT" (Note 3) | | | | | | | | | | |
| | "Xirallic NXT M260-60 WNT Panthera Silver" (Note 4) | | | | | | | | | | |
| Titanium Oxide-Coated Light Interference Pigment other than (D) | "Twincle PEARL SXC-SO" (Note 5) | | | | | | | | | | |
| Scale-Like Aluminum Pigment (E) | "STAPA HYDROLAN IL 9160" | 5 | | | | 2 | 2 | 5 | 8 | 12 | 14 |
| | "Terracess L" | | | | | | | | | | |
| | "LMR-100" | | | | | | | | | | |
| Acrylic Resin (A"-1) Having Hydroxy Group and Phosphate Group | | 10 | 10 | 10 | 10 | 10 | 10 | 10 | 10 | 10 | 10 |
| Pigment Dispersion Name | | (P-1) | (P-2) | (P-3) | (P-5) | (P-7) | (P-8) | (P-9) | (P-10) | (P-11) | (P-12) |
| Water-Dispersible Hydroxy Group-Containing Acrylic Resin (A'-1) | | 30 | 30 | 30 | 30 | 30 | 30 | 30 | 30 | 30 | 30 |
| Hydroxy Group-Containing Polyester Resin (B)) | (B-1) | 30 | 30 | 30 | 30 | 30 | 30 | 30 | 30 | 30 | 30 |
| | (B-2) | | | | | | | | | | |
| | (B-3) | | | | | | | | | | |
| | B-4) | | | | | | | | | | |
| | (B-5) | | | | | | | | | | |
| | (B-6) | | | | | | | | | | |
| | (B-7) | | | | | | | | | | |
| Amino Resin (C) | "Cymel 325" | 30 | 30 | 30 | 30 | 30 | 30 | 30 | 30 | 30 | 30 |
| Total Resin | | 100 | 100 | 100 | 100 | 100 | 100 | 100 | 100 | 100 | 100 |
| Brightness Material Total | | 13 | 13 | 4 | 24 | 7 | 5 | 25 | 28 | 15 | 17 |
| (D)/(E) | | 1.6 | 1 | I | 1 | 2.5 | 1.5 | 4 | 2.5 | 0.25 | 0.21 |

TABLE 3-2

| | | Ex | | | | | | | | |
|---|---|---|---|---|---|---|---|---|---|---|
| | | 11 | 12 | 13 | 14 | 15 | 16 | 17 | 18 | 19 |
| Paint Composition Name | | (Y-11) | (Y-12) | (Y-13) | (Y-14) | (Y-15) | (Y-16) | (Y-17) | (Y-18) | (Y-19) |
| Titanium Oxide-Coated Light Interference Pigment (D) Having L*15 Value of 100 or More and L*110 Value of 65 or Less | "IRIODON 9612 Silver-Gray Fine Stain SW" (Note 1) | 6 | 5 | 11 | 13 | 12 | | | | |
| | "SYMIC OEM Medium Opaque Silver" (Note 2) | | | | | | | 8 | | |
| | "IRIODIN 605WNT" (Note 3) | | | | | | 8 | | | |
| | "Xirallic NXT M260-60 WNT Panthera Silver" (Note 4) | | | | | | | | 8 | 11 |
| Titanium Oxide-Coated Light Interference Pigment other than (D) | "Twincle PEARL SXC-SO" (Note 5) | | | | | | | | | |
| Scale-Like Aluminum Pigment (E) | "STAPA HYDROLAN IL 9160" | 6 | 8 | 3 | 3 | 12 | 5 | 5 | 5 | 3 |
| | "Terracess L" | | | | | | | | | |
| | "LMR-100" | | | | | | | | | |
| Acrylic Resin (A"-1) Having Hydroxy Group and Phosphate Group | | 10 | 10 | 10 | 10 | 10 | 10 | 10 | 10 | 10 |
| Pigment Dispersion Name | | (P-13) | (P-14) | (P-15) | (P-16) | (P-17) | (P-19) | (P-20) | (P-21) | (P-22) |
| Water-Dispersible Hydroxy Group-Containing Acrylic Resin (A'-1) | | 30 | 30 | 30 | 30 | 30 | 30 | 30 | 30 | 30 |
| Hydroxy Group-Containing Polyester Resin (B)) | (B-1) | 30 | 30 | 30 | 30 | 30 | 30 | 30 | 30 | 30 |
| | (B-2) | | | | | | | | | |
| | (B-3) | | | | | | | | | |
| | (B-4) | | | | | | | | | |
| | (B-5) | | | | | | | | | |
| | (B-6) | | | | | | | | | |
| | (B-7) | | | | | | | | | |
| Amino Resin (C) | "Cymel 325" | 30 | 30 | 30 | 30 | 30 | 30 | 30 | 30 | 30 |
| Total Resin | | 100 | 100 | 100 | 100 | 100 | 100 | 100 | 100 | 100 |
| Brightness Material Total | | 12 | 13 | 14 | 16 | 24 | 13 | 13 | 13 | 14 |
| (D)/(E) | | 1 | 0.63 | 3.67 | 4.33 | 1 | 1.6 | 1.6 | 1.6 | 3.67 |

TABLE 3-3

| | | Ex | | | | | | | | | | | | |
|---|---|---|---|---|---|---|---|---|---|---|---|---|---|---|
| | | 20 | 21 | 22 | 23 | 24 | 25 | 26 | 27 | 28 | 29 | 30 | 31 | 32 |
| Paint Composition Name | | (Y-20) | (Y-21) | (Y-22) | (Y-23) | (Y-24) | (Y-25) | (Y-26) | (Y-27) | (Y-28) | (Y-29) | (Y-30) | (Y-31) | (Y-32) |
| Titanium Oxide-Coated Light Interference Pigment (D) Having L*15 Value of 100 or More and L*110 Value of 65 or Less | "IRIODON 9612 Silver-Gray Fine Stain SW" (Note 1) | 8 | 8 | 8 | 8 | 8 | 8 | 8 | 8 | 8 | 8 | 8 | 8 | 3 |
| | "SYMIC OEM Medium Opaque Silver" (Note 2) | | | | | | | | | | | | | |
| | "IRIODIN 605WNT" (Note 3) | | | | | | | | | | | | | |
| | "Xirallic NXT M260-60 WNT Panthera Silver" (Note 4) | | | | | | | | | | | | | |
| Titanium Oxide-Coated Light Interference Pigment other than (D) | "Twincle PEARL SXC-SO" (Note 5) | | | | | | | | | | | | | |
| Scale-Like Aluminum Pigment (E) | "STAPA HYDROLAN IL 9160" | 5 | 5 | 5 | 5 | 5 | 5 | 5 | 5 | 5 | 5 | 5 | 5 | 21 |
| | "Terracess L" | | | | | | | | | | | | | |
| | "LMR-100" | | | | | | | | | | | | | |
| Acrylic Resin (A"-1) Having Hydroxy Group and Phosphate Group | | 10 | 10 | 10 | 10 | 10 | 10 | 10 | 10 | 10 | 10 | 10 | 10 | 10 |
| Pigment Dispersion Name | | (P-1) | (P-1) | (P-1) | (P-1) | (P-1) | (P-1) | (P-1) | (P-1) | (P-1) | (P-1) | (P-1) | (P-1) | (P-27) |
| Water-Dispersible Hydroxy Group-Containing Acrylic Resin (A'-1) | | 15 | 45 | 43 | 25 | 38 | 27 | 30 | 30 | 30 | 30 | 30 | 30 | 30 |
| Hydroxy Group-Containing Polyester Resin (B)) | (B-1) | 38 | 25 | 13 | 45 | 37 | 28 | | | | | | | 30 |
| | (B-2) | | | | | | | 30 | | | | | | |
| | (B-3) | | | | | | | | 30 | | | | | |
| | (B-4) | | | | | | | | | 30 | | | | |
| | (B-5) | | | | | | | | | | 30 | | | |
| | (B-6) | | | | | | | | | | | 30 | | |
| | (B-7) | | | | | | | | | | | | 30 | |
| Amino Resin (C) | "Cymel 325" | 37 | 20 | 34 | 20 | 15 | 35 | 30 | 30 | 30 | 30 | 30 | 30 | 30 |
| Total Resin | | 100 | 100 | 100 | 100 | 100 | 100 | 100 | 100 | 100 | 100 | 100 | 100 | 100 |
| Brightness Material Total | | 13 | 13 | 13 | 13 | 13 | 13 | 13 | 13 | 13 | 13 | 13 | 13 | 24 |
| (D)/(E) | | 1.6 | 1.6 | 1.6 | 1.6 | 1.6 | 1.6 | 1.6 | 1.6 | 1.6 | 1.6 | 1.6 | 1.6 | 0.143 |

TABLE 3-4

| | | Comp Ex | | | | | | |
|---|---|---|---|---|---|---|---|---|
| | | 1 | 2 | 3 | 4 | 5 | 6 | 7 |
| Paint Composition Name | | (Y-33) | (Y-34) | (Y-35) | (Y-36) | (Y-37) | (Y-38) | (Y-39) |
| Titanium Oxide-Coated Light Interference Pigment (D) Having L*15 Value of 100 or More and L*110 Value of 65 or Less | "IRIODON 9612 Silver-Gray Fine Stain SW" (Note 1) | 2.5 | 26 | | | | | |
| | "SYMIC OEM Medium Opaque Silver" (Note 2) | | | | | | | |
| | "IRIODIN 605WNT" (Note 3) | | | | | | | |
| | "Xirallic NXT M260-60 WNT Panthera Silver" (Note 4) | | | | | | | |
| Titanium Oxide-Coated Light Interference Pigment other than (D) | "Twincle PEARL SXC-SO" (Note 5) | | | | 8 | | | |
| Scale-Like Aluminum Pigment (E) | "STAPA HYDROLAN IL 9160" | | | 5 | 5 | 8 | 5 | 8 |
| | "Terracess L" | | | | | 8 | 5 | |
| | "LMR-100" | | | | | | 8 | 5 |
| Acrylic Resin (A"-1) Having Hydroxy Group and Phosphate Group | | 10 | 10 | 10 | 10 | 10 | 10 | 10 |

TABLE 3-4-continued

| | | Comp Ex | | | | | | |
|---|---|---|---|---|---|---|---|---|
| | | 1 | 2 | 3 | 4 | 5 | 6 | 7 |
| Pigment Dispersion Name | | (P-4) | (P-6) | (P-18) | (P-23) | (P-24) | (P-25) | (P-26) |
| Water-Dispersible Hydroxy Group-Containing Acrylic Resin (A'-1) | | 30 | 30 | 30 | 30 | 30 | 30 | 30 |
| Hydroxy Group-Containing Polyester Resin (B)) | (B-1) | 30 | 30 | 30 | 30 | 30 | 30 | 30 |
| | (B-2) | | | | | | | |
| | (B-3) | | | | | | | |
| | (B-4) | | | | | | | |
| | (B-5) | | | | | | | |
| | (B-6) | | | | | | | |
| | (B-7) | | | | | | | |
| Amino Resin (C) | "Cymel 325" | 30 | 30 | 30 | 30 | 30 | 30 | 30 |
| Total Resin | | 100 | 100 | 100 | 100 | 100 | 100 | 100 |
| Brightness Material Total | | 2.5 | 26 | 13 | 5 | 8 | 5 | 8 |
| (D)/(E) | | — | — | — | — | — | — | — |

TABLE 3-5

| | | Comp Ex | | | | | |
|---|---|---|---|---|---|---|---|
| | | 8 | 9 | 10 | 11 | 12 | 13 |
| Paint Composition Name | | (Y-40) | (Y-41) | (Y-42) | (Y-43) | (Y-44) | (Y-45) |
| Titanium Oxide-Coated Light Interference Pigment (D) Having L*15 Value of 100 or More and L*110 Value of 65 or Less | "IRIODON 9612 Silver-Gray Fine Stain SW" (Note 1) | 8 | 8 | 8 | 8 | 8 | 8 |
| | "SYMIC OEM Medium Opaque Silver" (Note 2) | | | | | | |
| | "IRIODIN 605WNT" (Note 3) | | | | | | |
| | "Xirallic NXT M260-60 WNT Panthera Silver" (Note 4) | | | | | | |
| Titanium Oxide-Coated Light Interference Pigment other than (D) | "Twincle PEARL SXC-SO" (Note 5) | | | | | | |
| Scale-Like Aluminum Pigment (E) | "STAPA HYDROLAN IL 9160" | 5 | 5 | 5 | 5 | 5 | 5 |
| | "Terracess L" | | | | | | |
| | "LMR-100" | | | | | | |
| Acrylic Resin (A"-1) Having Hydroxy Group and Phosphate Group | | 10 | 10 | 10 | 10 | 10 | 10 |
| Pigment Dispersion Name | | (P-1) | (P-1) | (P-1) | (P-1) | (P-1) | (P-1) |
| Water-Dispersible Hydroxy Group-Containing Acrylic Resin (A'-1) | | 5 | 60 | 48 | 15 | 43 | 20 |
| Hydroxy Group-Containing Polyester Resin (B)) | (B-1) | 48 | 10 | 8 | 55 | 40 | 25 |
| | (B-2) | | | | | | |
| | (B-3) | | | | | | |
| | (B-4) | | | | | | |
| | (B-5) | | | | | | |
| | (B-6) | | | | | | |
| | (B-7) | | | | | | |
| Amino Resin (C) | "Cymel 325" | 37 | 20 | 34 | 20 | 7 | 45 |
| Total Resin | | 100 | 100 | 100 | 100 | 100 | 100 |
| Brightness Material Total | | 13 | 13 | 13 | 13 | 13 | 13 |
| (D)/(E) | | 1.6 | 1.6 | 1.6 | 1.6 | 1.6 | 1.6 |

(Production of Colored Paint Composition (X))

Production Example 37

"WP-522H N-2.0" (product name, manufactured by Kansai Paint, polyester resin-based water-based colored paint) and "WP-522H N-8.0" (product name, manufactured by Kansai Paint, polyester resin-based water-based colored paint) were uniformly mixed to obtain a colored paint composition (X-1). At this time, the mixing ratio of the above "WP-522H N-2.0" (product name, manufactured by Kansai Paint, polyester resin-based water-based colored paint) and the above "WP-522H N-8.0" (product name, manufactured by Kansai Paint, polyester resin-based water-based colored paint) was set to a mixing ratio in which L*110 value of the colored coating film obtained by coating the above colored paint composition (X-1) on the object to be coated so that the cured film thickness was 15 m was 35.

Production Examples 38 to 41

Colored paint compositions (X-2) to (X-5) were obtained in the same manner as in Production Example 37, except that the mixing ratio of "WP-522H N-2.0" (product name, Kansai Paint, polyester resin-based water-based colored paint) and "WP-522H N-8.0" (product name, Kansai Paint, polyester resin-based water-based colored paint) of Production Example 37 was changed to the mixing ratio in which the L*110 values of the colored coating film obtained by coating the object to be coated with the obtained colored paint compositions so that the thickness of the cured film was 15 m became the values shown in Table 4, which is described later.

Production Example 42

"Ascarex 3800-2 D 35 primer (CD)" (product name, manufactured by Kansai Paint, polyolefin-containing water-based colored paint) and "Ascarex 3800-1 W 24 color base (CD)" (product name, manufactured by Kansai Paint, polyolefin-containing water-based colored paint) were uniformly mixed to obtain a colored paint composition (X-6). At this time, "Ascarex 3800-2 D35 Primer (CD)" (product name, manufactured by Kansai Paint, polyolefin-containing water-based colored paint) and "Ascarex 3800-1 W 24 color base (CD)" (product name, manufactured by Kansai Paint, polyolefin-containing water-based colored paint) were mixed to a mixing ratio in which L*110 value of the colored coating film obtained by coating the above colored paint composition (X-6) on the object to be coated so that the cured film thickness was 15 m was 35.

Production Examples 43 to 46

The colored paint compositions (X-7) to (X-10) were obtained in the same manner as in Production Example 42, except that the mixing ratio of "Ascarex 3800-2 D 35 primer (CD)" (product name, polyolefin-containing water-based colored paint, manufactured by Kansai Paint) and "Ascarex 3800-1 W 24 color base (CD)" (product name, polyolefin-containing water-based colored paint, manufactured by Kansai Paint) of Production Example 42 were changed to the mixing ratio in which the L*110 value of the colored coating film obtained by coating the obtained colored paint composition on an object to be coated so that the cured film thickness was 15 μm became the values shown in Table 4, which is described later.

[Preparation of Evaluation Coating Plates]
(Preparation of Evaluation Object to be Coated (S1))

As a metallic material, "Elecron GT-10" (product name, manufactured by Kansai Paint, Elecron is a registered trademark, thermosetting epoxy resin-based cationic electrodeposition coating material) was subjected to electrodeposition coating so that the film thickness was 20 m on an alloyed molten galvanized steel sheet subjected to zinc phosphate treatment, and then heated at 170° C. for 30 minutes to cure. Thereafter, on this electrodeposited coating film, any of the colored paint compositions (X-1) to (X-5) obtained in Production Examples 37 to 41 was coated with a hand spray gun so that cured coating film had a thickness of 15 m, allowed to stand for 5 minutes, and then preheated at 80° C. for 3 minutes to obtain evaluation objects to be coated (S1-1) to (S1-5) having lightness L*110 values of 35, 40, 50, 60, and 70, respectively.

(Preparation of Evaluation Object to be Coated (S2))

As a metallic material, "Elecron GT-10" (product name, manufactured by Kansai Paint, Elecron is a registered trademark, a thermosetting epoxy resin-based cationic electrodeposition coating material) was subjected to electrodeposition coating so that the film thickness was 20 m on an alloyed molten galvanized steel sheet subjected to zinc phosphate treatment, and then heated at 170° C. for 30 minutes to cure. Then, on this electrodeposition coating film, any of the colored paint compositions (X-1) to (X-5) obtained in Production Examples 37 to 41 was coated with a hand spray gun so that the cured coating film was 15 m, allowed to stand for 5 minutes, then preheated at 80° C. for 3 minutes, and then heated at 140° C. for 30 minutes to cure the coating film, whereby the evaluation objects to be coated (52-1) to (S2-5) having a lightness L*110 values of 35, 40, 50, 60, and 70, respectively, were obtained.

(Preparation of Evaluation Object to be Coated (S3))

As a plastic material, a black polypropylene plate (350 mm×10 mm×2 mm) was prepared. After the surface of the plastic material was subjected to a degreasing treatment by

TABLE 4

| Production Ex No. | 37 | 38 | 39 | 40 | 41 | 42 | 43 | 44 | 45 | 46 |
|---|---|---|---|---|---|---|---|---|---|---|
| Colored Paint Composition Name | (X-1) | (X-2) | (X-3) | (X-4) | (X-5) | (X-6) | (X-7) | (X-8) | (X-9) | (X-10) |
| L110 * value of the colored coating film obtained by coating Object to be Coated so that cured film thickness was 15 μm | 35 | 40 | 50 | 60 | 70 | 35 | 40 | 50 | 60 | 70 |

(Preparation of Clearcoat Paint Composition)
Clearcoat Paint Composition (Z-1)

"KINO6510" (product name, manufactured by Kansai Paint, hydroxy group-containing resin/polyisocyanate-containing resin, acrylic resin/urethane resin two-liquid organic solvent coating material) was used as the clearcoat paint composition (Z-1).

Clearcoat Paint Composition (Z-2)

"KINO1210" (product name, manufactured by Kansai Paint, carboxyl group-containing resin/epoxy group-containing resin, acrylic resin one-liquid organic solvent coating material) was used as the clearcoat paint composition (Z-2).

Clearcoat Paint Composition (Z-3)

Madiclon TC-71 (product name, manufactured by Kansai Paint, hydroxy group-containing resin/melamine resin, one-liquid acryl/melamine resin-based organic solvent paint) was used as the clearcoat paint composition (Z-3).

wiping with gauze containing petroleum benzine, any of the colored paint compositions (X-6) to (X-10) obtained in Production Examples 42 to 46 was coated with a hand spray gun so that the thickness of the cured coating film was 15 m, and after standing for 5 minutes, preheating was carried out at 80° C. for 3 minutes, whereby evaluation objects to be coated (53-1) to (53-5) having lightness L*110 values of 35, 40, 50, 60, and 70, respectively, were obtained.

Example 33

To an evaluation object to be coated (S1-2) having a lightness L*110=40 and an evaluation object to be coated (S2-2) having a lightness L*110=40, the basecoat paint composition (Y-1) was applied with a hand spray gun so that the cured film thickness was 10 m, which was then allowed to stand for 5 minutes, and then preheated at 80° C. for 3 minutes.

Thereafter, on the uncured basecoat film, the clearcoat paint composition (Z-1) obtained above was hand spray gun coated so that the cured film thickness was 40 m, which was then allowed to stand for 7 minutes, and then heated at 140° C. for 30 minutes to heat and cure all of the multilayer coating film, thereby producing two evaluation coating plates.

Further, on the evaluation object to be coated (S3-2) having a lightness $L*110=40$, the basecoat paint composition (Y-1) was applied with a hand spray gun so that the cured film thickness was 10 m, which was then allowed to stand for 5 minutes, and then preheated at 80° C. for 3 minutes.

On the uncured basecoat film, the clearcoat paint composition (Z-1) obtained above was hand spray gun coated so that the cured film thickness was 40 m, which was then allowed to stand for 7 minutes, and then heated at 80° C. for 30 minutes to heat and cure all of the multilayer coating film to prepare an evaluation coating plate.

Examples 34 to 70 and Comparative Examples 14 to 26

Evaluation coating plates were prepared in the same manner as in Example 33, except that the combination of the evaluation object to be coated, the basecoat paint composition, and the clearcoat paint composition of Example 33 was changed as shown in Table 5, which is described later. The evaluation coating plates prepared using the evaluation object to be coated (53-2) of Examples 64 and 65 were not evaluated because the formed coating film was not sufficiently cured.

The following evaluations were carried out using the obtained evaluation coating plates. The results are shown in Table 5.

[Evaluations]

(FF Value)

Using a multi-angle spectrophotometer (product name "MA-68II", manufactured by X-Rite), the L* value ($L*15$ value) having a light receiving angle of 15 degrees and the L* value ($L*110$ value) having a light receiving angle of 110 degrees were measured in each of the obtained evaluation coating plates, and the FF value of the coating film on each of the evaluation coating plates was calculated by the following formula and evaluated by the following standard. A, B and C are acceptable levels.

FF value=$L*15$ value/$L*110$ value

A: FF value was 3.5 or more.

B: FF value was 3.0 or more and less than 3.5,

C: FF value was 2.5 or more and less than 3.0,

D: FF value was 1.5 or more and less than 2.5,

E: FF value was less than 1.5.

(Graininess (Visual))

The obtained evaluation coating plates were visually observed and evaluated according to the following criteria. The evaluation was carried out by a total of five persons, two designers and three engineers, who were engaged in color development for more than three years, in a discussion. Excellent and Good are acceptable levels.

Excellent Graininess was extremely low,

Good: Graininess was low,

Fair: Graininess was high,

Poor: Graininess was extremely high.

(Chipping Resistance)

An evaluation coating plate was installed on a specimen holding table of an airstone test machine JA-400 type (chipping test device) manufactured by Suga Test Instruments Co., Ltd., and 50 g of granite crushed stone having a particle size of No. 7 was collided with each evaluation coating plate at an angle of 45 degrees by compressed air at a pressure of 0.392 MPa (4 kgf/cm$^2$) from a distance of 30 cm at −20° C. Thereafter, the obtained evaluation coating plate was washed with water, dried, and a coating adhesive tape (manufactured by Nichiban Co., Ltd.) was adhered to the coating surface, and then the coating film was peeled off, and the degree of occurrence of scratches and the like of the coating film were visually observed and evaluated by the following criteria. A, B and C are acceptable levels.

A: The size of the scratches is extremely small, and the electrodeposited surface or the steel plate of the substrate is not exposed, B: The size of the scratches is small, and the electrodeposited surface or the steel plate of the substrate is not exposed, C: Though the size of the scratches is small, the electrodeposited surface and the steel plate of the substrate are exposed, D: The size of the scratches is considerably large, and the electrodeposited surface and the steel plate of the substrate are exposed, E: The size of the scratches is considerably large, and the steel plate of the substrate is also greatly exposed.

(Adhesiveness)

The obtained evaluation coating plates were immersed in hot water at 40° C. for 240 hours, and then pulled up and dried at 20° C. for 12 hours. Then, the multilayer coating film of the evaluation coating plate was cut into grids with a cutter so as to reach the base, and 100 grid squares having a size of 2 mm×2 mm were made. Subsequently, an adhesive cellophane tape was adhered to the surface, and the remaining state of the grid-cut coating film after the tape was rapidly peeled off at 20° C. was examined, and the adhesiveness was evaluated based on the following criteria. A, B and C are acceptable levels.

A: There are 100 remaining grid-cut coatings, and there are no small raised edges of the coating film at the edges of the cuts, B: There are 100 remaining grid-cut coatings, but there are 1 to 10 small raised edges of the coating film at the edges of the cuts, C: There are 100 remaining grid-cut coatings, but there are 11 or more small raised edges of the coating film at the edges of the cuts, D: There are 99 to 90 remaining grid-cut coatings, E: The number of remaining grid-cut coatings is 89 or less.

From the above results, it has been found that the paint composition of the present invention can form a coating film having a small graininess, a high flip-flop property, and good chipping resistance and adhesion.

TABLE 5-1

| | | | Ex | | | | | | | | | |
|---|---|---|---|---|---|---|---|---|---|---|---|---|
| | | | 33 | 34 | 35 | 36 | 37 | 38 | 39 | 40 | 41 | 42 |
| Lightness (L*100) of Evaluation Object to be Coated | | | 40 | 40 | 40 | 40 | 40 | 40 | 40 | 40 | 40 | 40 |
| Paint Composition (Y) | Paint Composition Name | | (Y-1) | (Y-2) | (Y-3) | (Y-4) | (Y-5) | (Y-6) | (Y-7) | (Y-8) | (Y-9) | (Y-10) |
| Clearcoat Paint Composition (Z) | Clearcoat Paint Composition Name | | (Z-1) | (Z-1) | (Z-1) | (Z-1) | (Z-1) | (Z-1) | (Z-1) | (Z-1) | (Z-1) | (Z-1) |
| Evaluation | Object to be Coated (S1) | Name of Evaluation Object to be Coated | (S1-2) | (S1-2) | (S1-2) | (S1-2) | (S1-2) | (S1-2) | (S1-2) | (S1-2) | (S1-2) | (S1-2) |
| | | L*110 | 33 | 24 | 37 | 23 | 37 | 39 | 22 | 22 | 27 | 22 |
| | | L*15 | 121 | 115 | 95 | 119 | 116 | 110 | 117 | 119 | 138 | 148 |
| | | FF Value | A | A | C | A | B | C | A | A | A | A |
| | | Graininess (Visual) | Excellent | Good | Good | Good | Excellent | Excellent | Good | Good | Excellent | Excellent |
| | | Chipping Resistance | A | A | C | A | B | C | A | A | C | C |
| | | Adhesion | A | A | A | C | A | A | B | C | A | B |
| | Object to be Coated (S2) | Name of Evaluation Object to be Coated | (S2-2) | (S2-2) | (S2-2) | (S2-2) | (S2-2) | (S2-2) | (S2-2) | (S2-2) | (S2-2) | (S2-2) |
| | | L*110 | 34 | 27 | 39 | 26 | 40 | 39 | 23 | 25 | 30 | 25 |
| | | L*15 | 124 | 119 | 98 | 121 | 120 | 113 | 120 | 123 | 142 | 151 |
| | | FF Value | A | A | C | A | B | C | A | A | A | A |
| | | Graininess (Visual) | Excellent | Good | Good | Good | Excellent | Excellent | Good | Good | Excellent | Excellent |
| | | Chipping Resistance | A | A | C | A | B | C | A | A | C | C |
| | | Adhesion | A | A | A | C | A | A | B | C | A | B |
| | Object to be Coated (S3) | Name of Evaluation Object to be Coated | (S3-2) | (S3-2) | (S3-2) | (S3-2) | (S3-2) | (S3-2) | (S3-2) | (S3-2) | (S3-2) | (S3-2) |
| | | L*110 | 34 | 26 | 38 | 24 | 38 | 39 | 22 | 23 | 28 | 23 |
| | | L*15 | 122 | 117 | 96 | 120 | 118 | 112 | 119 | 121 | 140 | 149 |
| | | FF Value | A | A | C | A | B | C | A | A | A | A |
| | | Graininess (Visual) | Excellent | Good | Good | Good | Excellent | Excellent | Good | Good | Excellent | Excellent |
| | | Chipping Resistance | A | A | B | A | B | B | A | A | B | B |
| | | Adhesion | A | A | A | C | A | A | B | C | A | B |

TABLE 5-2

| | | | Ex | | | | | | | | |
|---|---|---|---|---|---|---|---|---|---|---|---|
| | | | 43 | 44 | 45 | 46 | 47 | 48 | 49 | 50 | 51 |
| Lightness (L*100) of Evaluation Object to be Coated | | | 40 | 40 | 40 | 40 | 40 | 40 | 40 | 40 | 40 |
| Paint Composition (Y) | Paint Composition Name | | (Y-11) | (Y-12) | (Y-13) | (Y-14) | (Y-15) | (Y-16) | (Y-17) | (Y-18) | (Y-19) |
| Clearcoat Paint Composition (Z) | Clearcoat Paint Composition Name | | (Z-1) | (Z-1) | (Z-1) | (Z-1) | (Z-1) | (Z-1) | (Z-1) | (Z-1) | (Z-1) |
| Evaluation | Object to be Coated (S1) | Name of Evaluation Object to be Coated | (S1-2) | (S1-2) | (S1-2) | (S1-2) | (S1-2) | (S1-2) | (S1-2) | (S1-2) | (S1-2) |
| | | L*110 | 22 | 25 | 28 | 31 | 26 | 33 | 33 | 30 | 29 |
| | | L*15 | 111 | 113 | 112 | 113 | 151 | 120 | 121 | 120 | 114 |
| | | FF Value | A | A | A | A | A | A | A | A | A |
| | | Graininess (Visual) | Excellent | Excellent | Excellent | Good | Excellent | Excellent | Excellent | Excellent | Excellent |
| | | Chipping Resistance | A | B | A | A | A | A | A | B | B |
| | | Adhesion | A | A | A | A | C | A | A | A | A |
| | Object to be Coated (S2) | Name of Evaluation Object to be Coated | (S2-2) | (S2-2) | (S2-2) | (S2-2) | (S2-2) | (S2-2) | (S2-2) | (S2-2) | (S2-2) |
| | | L*110 | 23 | 25 | 28 | 33 | 30 | 34 | 34 | 33 | 30 |
| | | L*15 | 113 | 117 | 115 | 116 | 153 | 122 | 124 | 124 | 116 |
| | | FF Value | A | A | A | A | A | A | A | A | A |
| | | Graininess (Visual) | Excellent | Excellent | Excellent | Good | Excellent | Excellent | Excellent | Excellent | Excellent |
| | | Chipping Resistance | A | B | A | A | A | A | A | B | B |
| | | Adhesion | A | A | A | A | C | A | A | A | A |
| | Object to be Coated (S3) | Name of Evaluation Object to be Coated | (S3-2) | (S3-2) | (S3-2) | (S3-2) | (S3-2) | (S3-2) | (S3-2) | (S3-2) | (S3-2) |
| | | L*110 | 22 | 25 | 28 | 32 | 28 | 33 | 33 | 32 | 30 |
| | | L*15 | 112 | 115 | 114 | 115 | 152 | 121 | 122 | 122 | 115 |
| | | FF Value | A | A | A | A | A | A | A | A | A |
| | | Graininess (Visual) | Excellent | Excellent | Excellent | Good | Excellent | Excellent | Excellent | Excellent | Excellent |
| | | Chipping Resistance | A | B | A | A | A | A | A | B | B |
| | | Adhesion | A | A | A | A | C | A | A | A | A |

TABLE 5-3

| | | | Ex | | | | | | | | | | |
|---|---|---|---|---|---|---|---|---|---|---|---|---|---|
| | | | 52 | 53 | 54 | 55 | 56 | 57 | 58 | 59 | 60 | 61 | 62 | 63 |
| Lightness (L*100) of Evaluation Object to be Coated | | | 40 | 40 | 40 | 40 | 40 | 40 | 40 | 40 | 40 | 40 | 40 | 40 |
| Paint Composition (Y) | Paint Composition Name | | (Y-20) | (Y-21) | (Y-22) | (Y-23) | (Y-24) | (Y-25) | (Y-26) | (Y-27) | (Y-28) | (Y-29) | (Y-30) | (Y-31) |
| Clearcoat Paint Composition (Z) | Clearcoat Paint Composition Name | | (Z-1) | (Z-1) | (Z-1) | (Z-1) | (Z-1) | (Z-1) | (Z-1) | (Z-1) | (Z-1) | Z-1) | (Z-1) | (Z-1) |
| Evaluation | Object to be Coated (S1) | Name of Evaluation Object to be Coated | (S1-2) | (S1-2) | (S1-2) | (S1-2) | (S1-2) | (S1-2) | (S1-2) | (S1-2) | (S1-2) | (S1-2) | (S1-2) | (S1-2) |
| | | L*110 | 32 | 37 | 36 | 27 | 35 | 35 | 28 | 25 | 26 | 21 | 23 | 29 |
| | | L*15 | 124 | 112 | 109 | 116 | 120 | 117 | 122 | 120 | 119 | 121 | 118 | 118 |
| | | FF Value | A | B | B | A | B | B | A | A | A | A | A | A |
| | | Graininess (Visual) | Excellent | Excellent | Excellent | Excellent | Excellent | Excellent | Excellent | Excellent | Excellent | Excellent | Good | Excellent |
| | | Chipping Resistance | B | B | B | A | A | B | B | A | A | A | B | C |
| | | Adhesion | A | A | A | C | C | B | A | B | A | B | A | B |
| | Object to be Coated (S2) | Name of Evaluation Object to be Coated | (S2-2) | (S2-2) | (S2-2) | (S2-2) | (S2-2) | (S2-2) | (S2-2) | (S2-2) | (S2-2) | (S2-2) | (S2-2) | (S2-2) |
| | | L*110 | 33 | 38 | 37 | 29 | 35 | 37 | 30 | 27 | 26 | 24 | 25 | 30 |
| | | L*15 | 126 | 115 | 112 | 120 | 121 | 121 | 125 | 123 | 122 | 124 | 120 | 121 |
| | | FF Value | A | B | B | A | B | B | A | A | A | A | A | A |
| | | Graininess (Visual) | Excellent | Excellent | Excellent | Excellent | Excellent | Excellent | Excellent | Excellent | Excellent | Excellent | Good | Excellent |
| | | Chipping Resistance | B | B | B | A | A | B | B | A | A | A | B | C |
| | | Adhesion | B | A | B | C | C | B | A | B | A | B | C | B |
| | Object to be Coated (S3) | Name of Evaluation Object to be Coated | (S3-2) | (S3-2) | (S3-2) | (S3-2) | (S3-2) | (S3-2) | (S3-2) | (S3-2) | (S3-2) | (S3-2) | (S3-2) | (S3-2) |
| | | L*110 | 32 | 38 | 37 | 27 | 35 | 36 | 29 | 25 | 26 | 23 | 24 | 29 |
| | | L*15 | 125 | 114 | 110 | 118 | 120 | 119 | 123 | 121 | 120 | 123 | 119 | 119 |
| | | FF Value | A | B | B | A | B | B | A | A | A | A | A | A |
| | | Graininess (Visual) | Excellent | Excellent | Excellent | Excellent | Excellent | Excellent | Excellent | Excellent | Excellent | Excellent | Good | Excellent |
| | | Chipping Resistance | B | B | B | A | A | B | B | A | A | A | B | C |
| | | Adhesion | A | A | A | C | C | B | A | B | A | B | B | B |

TABLE 5-4

| | | | Ex | | | | | | |
|---|---|---|---|---|---|---|---|---|---|
| | | | 64 | 65 | 66 | 67 | 68 | 69 | 70 |
| Lightness (L*100) of Evaluation Object to be Coated | | | 40 | 40 | 35 | 50 | 60 | 70 | 40 |
| Paint Composition (Y) | Paint Composition Name | | (Y-1) | (Y-1) | (Y-1) | (Y-1) | (Y-1) | (Y-1) | (Y-32) |
| Clearcoat Paint Composition (Z) | Clearcoat Paint Composition Name | | (Z-2) | (Z-3) | (Z-1) | (Z-1) | (Z-1) | (Z-1) | (Z-1) |
| Evaluation | Object to be Coated (S1) | Name of Evaluation Object to be Coated | (S1-2) | (S1-2) | (S1-1) | (S1-3) | (S1-4) | (S1-5) | (S1-2) |
| | | L*110 | 27 | 21 | 22 | 37 | 37 | 50 | 21 |
| | | L*15 | 120 | 125 | 119 | 125 | 124 | 129 | 150 |
| | | FF Value | A | A | A | B | B | C | A |
| | | Graininess (Visual) | Excellent | Excellent | Excellent | Excellent | Excellent | Excellent | Excellent |
| | | Chipping Resistance | B | B | A | A | A | A | C |
| | | Adhesion | B | A | A | A | A | A | B |
| | Object to be | Name of Evaluation Object to be Coated | (S2-2) | (S2-2) | (S2-1) | (S2-3) | (S2-4) | (S2-5) | (S2-2) |

TABLE 5-4-continued

|  |  | Ex |  |  |  |  |  |  |
|---|---|---|---|---|---|---|---|---|
|  |  | 64 | 65 | 66 | 67 | 68 | 69 | 70 |
| Coated (S2) | L*110 | 30 | 22 | 24 | 37 | 41 | 48 | 24 |
|  | L*15 | 123 | 129 | 121 | 128 | 127 | 134 | 152 |
|  | FF Value | A | A | A | B | B | C | A |
|  | Graininess (Visual) | Excellent | Excellent | Excellent | Excellent | Excellent | Excellent | Excellent |
|  | Chipping Resistance | B | B | A | A | A | A | C |
|  | Adhesion | B | A | A | A | A | A | C |
| Object to be Coated (S3) | Name of Evaluation Object to be Coated | (S3-2) | (S3-2) | (S3-1) | (S3-3) | (S3-4) | (S3-5) | (S3-2) |
|  | L*110 |  |  | 23 | 37 | 39 | 48 | 22 |
|  | L*15 |  |  | 119 | 126 | 126 | 131 | 151 |
|  | FF Value |  |  | A | B | B | C | A |
|  | Graininess (Visual) |  |  | Excellent | Excellent | Excellent | Excellent | Excellent |
|  | Chipping Resistance |  |  | A | A | A | A | C |
|  | Adhesion |  |  | A | A | A | A | C |

TABLE 5-5

|  |  |  | Comp Ex |  |  |  |  |  |  |
|---|---|---|---|---|---|---|---|---|---|
|  |  |  | 14 | 15 | 16 | 17 | 18 | 19 | 20 |
| Lightness (L*100) of Evaluation Object to be Coated |  |  | 40 | 40 | 40 | 40 | 40 | 40 | 40 |
| Paint Composition (Y) | Paint Composition Name |  | (Y-33) | (Y-34) | (Y-35) | (Y-36) | (Y-37) | (Y-38) | (Y-39) |
| Clearcoat Paint Composition (Z) | Clearcoat Paint Composition Name |  | (Z-1) | (Z-1) | (Z-1) | (Z-1) | (Z-1) | (Z-1) | (Z-1) |
| Evaluation | Object to be Coated (S1) | Name of Evaluation Object to be Coated | (S1-2) | (S1-2) | (S1-2) | (S1-2) | (S1-2) | (S1-2) | (S1-2) |
|  |  | L*110 | 21 | 21 | 71 | 76 | 41 | 44 | 41 |
|  |  | L*15 | 50 | 119 | 109 | 106 | 118 | 115 | 118 |
|  |  | FF Value | D | A | D | E | C | C | C |
|  |  | Graininess (Visual) | Good | Poor | Fair | Good | Good | Good | Good |
|  |  | Chipping Resistance | E | A | C | A | B | A | B |
|  |  | Adhesion | A | D | A | E | D | D | C |
|  | Object to be Coated (S2) | Name of Evaluation Object to be Coated | (S2-2) | (S2-2) | (S2-2) | (S2-2) | (S2-2) | (S2-2) | (S2-2) |
|  |  | L*110 | 23 | 24 | 74 | 79 | 44 | 46 | 44 |
|  |  | L*15 | 54 | 122 | 112 | 109 | 121 | 117 | 122 |
|  |  | FF Value | D | A | D | E | C | C | C |
|  |  | Graininess (Visual) | Good | Poor | Fair | Excellent | Good | Good | Good |
|  |  | Chipping Resistance | E | A | C | C | C | A | B |
|  |  | Adhesion | A | D | A | E | D | D | C |
|  | Object to be Coated (S3) | Name of Evaluation Object to be Coated | (S3-2) | (S3-2) | (S3-2) | (S3-2) | (S3-2) | (S3-2) | (S3-2) |
|  |  | L*110 | 22 | 22 | 73 | 78 | 42 | 45 | 42 |
|  |  | L*15 | 52 | 121 | 110 | 108 | 120 | 115 | 120 |
|  |  | FF Value | D | A | D | E | C | C | C |
|  |  | Graininess (Visual) | Good | Poor | Fair | Good | Good | Good | Good |
|  |  | Chipping Resistance |  | A | B | A | A | A | B |
|  |  | Adhesion | A | E | A | E | E | E | E |

TABLE 5-6

|  |  |  | Comp Ex |  |  |  |  |  |
|---|---|---|---|---|---|---|---|---|
|  |  |  | 21 | 22 | 23 | 24 | 25 | 26 |
| Lightness (L*100) of Evaluation Object to be Coated |  |  | 40 | 40 | 40 | 40 | 40 | 40 |
| Paint Composition (Y) | Paint Composition Name |  | (Y-40) | (Y-41) | (Y-42) | (Y-43) | (Y-44) | (Y-45) |
| Clearcoat Paint Composition (Z) | Clearcoat Paint Composition Name |  | (Z-1) | (Z-1) | (Z-1) | (Z-1) | (Z-1) | (Z-1) |
| Evaluation | Object to be Coated (S1) | Name of Evaluation Object to be Coated | (S1-2) | (S1-2) | (S1-2) | (S1-2) | (S1-2) | (S1-2) |
|  |  | L*110 | 29 | 42 | 39 | 29 | 34 | 37 |
|  |  | L*15 | 126 | 108 | 108 | 118 | 117 | 118 |
|  |  | FF Value | A | C | C | A | B | B |
|  |  | Graininess (Visual) | Excellent | Excellent | Excellent | Excellent | Excellent | Excellent |
|  |  | Chipping Resistance | D | D | E | B | D | E |
|  |  | Adhesion | A | A | B | D | D | C |

TABLE 5-6-continued

| | | | Comp Ex | | | | | |
|---|---|---|---|---|---|---|---|---|
| | | | 21 | 22 | 23 | 24 | 25 | 26 |
| Object to be Coated (S2) | Name of Evaluation Object to be Coated | | (S2-2) | (S2-2) | (S2-2) | (S2-2) | (S2-2) | (S2-2) |
| | L*110 | | 30 | 43 | 41 | 30 | 37 | 38 |
| | L*15 | | 129 | 112 | 112 | 121 | 120 | 120 |
| | FF Value | | A | C | C | A | B | B |
| | Graininess (Visual) | | Excellent | Excellent | Excellent | Excellent | Excellent | Excellent |
| | Chipping Resistance | | D | D | E | B | D | E |
| | Adhesion | | C | A | C | D | D | C |
| Object to be Coated (S3) | Name of Evaluation Object to be Coated | | (S3-2) | (S3-2) | (S3-2) | (S3-2) | (S3-2) | (S3-2) |
| | L*110 | | 30 | 42 | 41 | 29 | 35 | 38 |
| | L*15 | | 128 | 110 | 110 | 120 | 118 | 119 |
| | FF Value | | A | C | C | A | B | B |
| | Graininess (Visual) | | Excellent | Excellent | Excellent | Excellent | Excellent | Excellent |
| | Chipping Resistance | | C | D | D | B | D | D |
| | Adhesion | | A | A | B | E | F | C |

The invention claimed is:

1. A paint composition, comprising a hydroxy group-containing acrylic resin (A), a hydroxy group-containing polyester resin (B), an amino resin (C), and a titanium oxide-coated light interference pigment (D), which has an L*15 value of 100 or more and an L*110 value of 65 or less, wherein the solid content of the hydroxy group-containing acrylic resin (A) is in the range of 20 to 60 parts by mass, the solid content of the hydroxy group-containing polyester resin (B) is in the range of 10 to 50 parts by mass, the solid content of the amino resin (C) is in the range of 5 to 40 parts by mass, and the solid content of the titanium oxide-coated light interference pigment (D) is in the range of 3 to 25 parts by mass, relative to 100 parts by mass of the total solid content of the hydroxy group-containing acrylic resin (A), the hydroxy group-containing polyester resin (B), and the amino resin (C),
wherein
the paint composition further comprises a scale-like aluminum pigment (E), wherein the content ratio (D)/(E) of the titanium oxide-coated light interference pigment (D), which has an L*15 value of 100 or more and an L*110 value of 65 or less, and the scale-like aluminum pigment (E) is in the range of 50/50 to 99/1 as a solid content mass ratio.

2. The paint composition according to claim 1, wherein the glass transition temperature (Tg) of the hydroxy group-containing polyester resin (B) is in the range of −20° C. to 5° C.

3. The paint composition according to claim 1, wherein the hydroxy group-containing polyester resin (B) is a hydroxy group-containing polyester resin obtained by condensing a polyol (b-1) having two or more hydroxy groups or an acid anhydride of the polycarboxylic acid and a polycarboxylic acid (b-2) having two or more carboxyl groups, and the polycarboxylic acid (b-2) or an acid anhydride of the polycarboxylic acid comprises at least one type selected from the group consisting of 1,2-cyclohexanedicarboxylic acid and 1,2-cyclohexanedicarboxylic acid anhydride.

4. The paint composition according to claim 1, wherein the titanium oxide-coated light interference pigment (D), which has an L*15 value of 100 or A more and an L*110 value of 65 or less, is a titanium oxide-coated mica pigment having an L*15 value of 100 or more and an L*110 value of 65 or less.

5. The paint composition according to claim 1, wherein the total solid content of the titanium oxide-coated light interference pigment (D), which has an L*15 value of 100 or more and an L*110 value of 65 or less, and the scale-like aluminum pigment (E) is in the range of 6 to 25 parts by mass, relative to 100 parts by mass of the total solid content of the hydroxy group-containing acrylic resin (A), the hydroxy group-containing polyester resin (B), and the amino resin (C).

6. The paint composition according to claim 1, wherein the content ratio (D)/(E) is in the range of 60/40 to 99/1.

7. The paint composition according to claim 1, wherein the content ratio (D)/(E) is in the range of 50/50 to 80/20.

8. The paint composition according to claim 1, wherein the content ratio (D)/(E) is in the range of 60/40 to 75/25.

9. The paint composition according to claim 1, wherein the content ratio (D)/(E) is in the range of 75/25 to 80/20.

10. The paint composition according to claim 1, wherein the content ratio (D)/(E) is in the range of 75/25 to 99/1.

11. A multilayer coating film, comprising a coating film layer formed from the paint composition according to claim 10.

12. A multilayer coating film, comprising a coating film layer formed from the paint composition according to claim 1.

13. A coated object, which contains as a coating the multilayer coating film according to claim 12.

14. A coating film layer formed from the paint composition according to claim 1.

15. A coated object, which contains as a coating layer, the coating film layer according to claim 14.

16. A multilayer coating film formation method, comprising the steps of:
(I-1) coating an object to be coated with a basecoat paint composition (Y) to form an uncured basecoat coating film,
(I-2) coating the uncured basecoat coating film with a clearcoat paint composition (Z) to form an uncured clearcoat coating film, and
(I-3) heating the uncured basecoat coating film and the uncured clearcoat coating film to simultaneously cure both films, wherein
the basecoat paint composition (Y) is the paint composition according to claim 1.

17. The multilayer coating film formation method according to claim 16, wherein the clearcoat paint composition (Z) comprises a hydroxy-group containing resin and a polyisocyanate compound.

18. The multilayer coating film formation method according to claim 16, wherein the L*15 value of the multilayer coating film is in the range of 75 to 140 and the L*110 value is in the range of 3 to 50.

19. A multilayer coating film formation method, comprising the steps of:
- (II-1) coating an object to be coated with a colored paint composition (X) to form an uncured colored coating film,
- (II-2) coating the uncured colored coating film with a basecoat paint composition (Y) to form an uncured basecoat coating film,
- (II-3) coating the uncured basecoat coating film with a clearcoat paint composition (Z) to form an uncured clearcoat coating film, and
- (II-4) heating the uncured colored coating film, the uncured basecoat coating film, and the uncured clearcoat coating film to simultaneously cure them, wherein the basecoat paint composition (Y) is the paint composition according to claim 1.

20. The multilayer coating film formation method according to claim 19, wherein the L*110 lightness value of the colored coating film formed by the colored paint composition (X) is in the range of 5 to 80.

* * * * *